US012493692B1

(12) United States Patent
Klippert et al.

(10) Patent No.: US 12,493,692 B1
(45) Date of Patent: Dec. 9, 2025

(54) SYSTEMS, METHODS, AND STORAGE MEDIA FOR API DETECTION AND MANAGEMENT IN A SOURCE-CODE REPOSITORY USING A COMPUTING PLATFORM

(71) Applicant: Stackhawk, Inc., Denver, CO (US)

(72) Inventors: Joni Klippert, Broomfield, CO (US); Scott Gerlach, Denver, CO (US); Keshava Das Berg, Longmont, CO (US)

(73) Assignee: Stackhawk, Inc., Denver, CO (US)

( * ) Notice: Subject to any disclaimer, the term of this patent is extended or adjusted under 35 U.S.C. 154(b) by 0 days.

(21) Appl. No.: 19/193,315

(22) Filed: Apr. 29, 2025

(51) Int. Cl.
G06F 21/56 (2013.01)

(52) U.S. Cl.
CPC ...... *G06F 21/563* (2013.01); *G06F 2221/033* (2013.01)

(58) Field of Classification Search
CPC .......................... G06F 21/563; G06F 2221/033
See application file for complete search history.

(56) References Cited

U.S. PATENT DOCUMENTS

| | | | | |
|---|---|---|---|---|
| 5,724,556 A | * | 3/1998 | Souder | G06F 8/20 703/2 |
| 2016/0092336 A1 | * | 3/2016 | Atanasiu | G06F 11/3698 717/133 |
| 2017/0212829 A1 | * | 7/2017 | Bales | G06F 8/75 |
| 2017/0214701 A1 | * | 7/2017 | Hasan | H04L 63/1433 |
| 2025/0094598 A1 | * | 3/2025 | Wang | G06F 21/577 |
| 2025/0103401 A1 | * | 3/2025 | Singh | G06F 11/3688 |

OTHER PUBLICATIONS

Katzy et al., "An Exploratory Investigation into Code License Infringements in Large Language Model Training Datasets", Apr. 2024, IEEE/ACM First International Conference on AI Foundation Models and Software Engineering, pp. 74-85 (Year: 2024).*
Neretin et al., "Multi-source Analysis of AI Vulnerabilities: Methodology and Algorithms of Data Collection", Sep. 2023, IEEE 12th International Conference on Intelligent Data Acquisition and Advanced Computing Systems: Technology and Applications, pp. 972-977 (Year: 2023).*

* cited by examiner

*Primary Examiner* — Kenneth W Chang
(74) *Attorney, Agent, or Firm* — NOD Law PC

(57) ABSTRACT

A system, method, and apparatus for Application Programming Interface (API) discovery that is configured to detect APIs, both active and inactive, and perform risk assessments and threat evaluations for the detected APIs. Furthermore, the system is configured to extract metadata information from a source code repository to detect APIs. In some examples, the source code repository (SCR) data can include API-specific data, non-API related data (i.e., data not related to any APIs), and metadata. The system can then assess the extracted information (e.g., API-related information) to identify vulnerabilities and conduct a threat evaluation (or threat eval). Additionally, the system is also configured to continuously and automatically update the extracted API-related information, repository metadata, etc., which can help obviate the need for manual intervention as a code base changes and APIs are created and destroyed over time.

20 Claims, 8 Drawing Sheets

SYSTEMS, METHODS, AND STORAGE MEDIA FOR API DETECTION AND MANAGEMENT IN A SOURCE-CODE REPOSITORY USING A COMPUTING PLATFORM

FIELD OF THE DISCLOSURE

The present disclosure generally relates to a computing system for Application Programming Interface (API) detection, API management, and threat evaluation in a source-code repository (SCR). More specifically, but without limitation, the present disclosure relates to systems, methods, and storage media for API detection, API management, threat evaluation, and developing mitigation strategies to alleviate security risks posed by unused APIs hosted across one or more SCRs.

BACKGROUND

Application Programming Interface (API) discovery is a critical step in effective cybersecurity. APIs are mechanisms of interaction between two software systems. In the context of web-based applications (web apps), APIs are typically endpoints identified by an Internet Protocol (IP) address that receive Hypertext Transfer Protocol (HTTP) requests from authorized users and return relevant information in line with the user request. For example, a Software-as-a-Service (SaaS) platform may have an API that allows enrolled customers to query their usage (e.g., energy usage, internet usage, etc.) for the current billing period, and even past invoices. Without proper security measures, these APIs can be vulnerable to exploits which can cause them to inadvertently divulge personal/confidential data to an unauthorized person and/or enable a malicious actor to gain unauthorized access to vital internal systems of an entity (e.g., company, organization, government agency, a personal computing device, etc.).

Thus, in some regards, poorly secured APIs (e.g., APIs with known vulnerabilities, defunct APIs that are unused but still accessible, to name a few) are a vital component of the "attack surface" of a software product. That is, APIs that are not properly secured can be easily attacked at their weak points and/or be easily exploited due to their inherent vulnerabilities and neglect, which can pose significant security threat to the vital internal systems of an entity.

API discovery, the process of identifying and monitoring APIs, is a critical function in effective application security. APIs must be identified so that proper security practices can be applied and enforced to secure them. The current state of the art in API discovery includes traffic analysis and API management platforms. Traffic analysis involves installing a program to capture and analyze network traffic, which can help in identifying active APIs. While traffic analysis can help identify active APIs, due to the consistent traffic flow to such APIs, the very nature of this technique renders it inadequate and ineffective at identifying neglected and forgotten APIs (i.e., due to the lack of traffic flow to these neglected APIs). This situation commonly occurs as a software product evolves over time and formerly active APIs fall into disuse. Despite not actively serving traffic, they can still be accessed and may contain critical vulnerabilities, e.g., due to their neglect. Some API management platforms provide the service of maintaining a list of APIs and information about them that can be used for API security. However, the weakness of these API management platforms is in the currency of their information. They can only be as good as the information that the software developer provides. If new APIs are added, but information related to them is not transmitted to the API management platform, the newly added APIs may remain invisible and therefore insufficiently secure to external threats.

Thus, there is a need for a refined API detection and management system that can help enhance API security, as compared to the prior art.

The description provided in the background section should not be assumed to be prior art merely because it is mentioned in or associated with the background section. The background section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Broadly, aspects of this disclosure are related to a system, method, and apparatus for Application Programming Interface (API) discovery that is configured to detect APIs, both active and inactive, and perform risk assessments and threat evaluations for the detected APIs. Furthermore, the system (also referred to as platform) is configured to extract metadata information from a source code repository to detect APIs. In some examples, the source code repository (SCR) data can include API-specific data, non-API related data (i.e., data not related to any APIs), and metadata. The system can then assess the extracted information (e.g., API-related information) to identify vulnerabilities and conduct a threat evaluation (or threat eval). Additionally, the system is also configured to continuously and automatically update the extracted API-related information, repository metadata, etc., which can help obviate the need for manual intervention as a code base changes and APIs are created and destroyed over time.

As used herein, the terms "AI-based API detection system", "API detection system", "AI-based API evaluation system", "API evaluation system", "computing system", and/or "computing platform" may be used interchangeably throughout the disclosure.

Furthermore, the terms "source code repository", "SCR", "code repository", and/or "repository" may be used interchangeably throughout the disclosure. In some cases, a source code repository may contain a plurality of development repositories (dev repo(s)), each dev repo containing multiple files, folders, etc. Additionally, dev repos within the same repository may or may not have the same organization structure (e.g., directory organization structure, files organization structure). For instance, dev repos within the same repository may comprise one or more differences related to one or more (1) file directory organization, (2) depth and breadth of file directories, (3) available support for one or more of version control, intra-organization collaboration, inter-organization collaboration, access control, and/or authorization control, (4) file naming conventions, (5) file path conventions, and (6) metadata information. Similarly, if there a plurality of SCRs, including at least a first SCR and a second SCR, being employed by an organization or enterprise, the first and the second SCRs may also differ with regards to any of (1) through (6) noted above.

Additionally, the terms "user device", user equipment", "UE", "mobile device", "personal computing device", "computing device", "computing platform", and/or "remote computing platform" may be used interchangeably throughout the disclosure.

In some embodiments, the API detection system is configured to take the address and authorization for a source code repository as an input; read, extract, and organize the repository metadata to serve as an appropriate input (e.g., AI prompt, also referred to as prompt) for analysis; analyze the AI prompt and capture the resulting outputs (e.g., summary reports, graphs, charts, or any other applicable means for presenting and displaying API evaluation results on a UI); store the outputs for future querying and analysis and present the selected output information in the user interface (UI) of a user device.

In some aspects, the techniques described herein relate to a method for Application Programming Interface (API) detection and evaluation in source code repositories (SCRs), the method including: receiving, from a user equipment (UE), one or more requests to analyze data stored across a plurality of SCRs, wherein the one or more requests include authentication information for accessing each of the plurality of SCRs, and at least one of the plurality of SCRs includes data associated with at least one Application Programming Interface (API); obtaining access to at least one SCR of the plurality of SCRs, based on providing the respective authentication information to each of the plurality of SCRs; scanning, based on obtaining access, the at least one SCR, wherein scanning the at least one SCR includes: analyzing a plurality of data files stored in the at least one SCR, extracting metadata analysis information from the at least one SCR, and identifying at least one API associated with the at least one SCR, based on analyzing the plurality of data files and extracting the metadata analysis information; generating an Artificial Intelligence (AI) prompt, based at least in part on extracting the metadata analysis information, wherein generating the AI prompt further includes transmitting the AI prompt to an AI module; receiving, from the AI module, at least one API analytics dataset for the at least one API; and displaying, via a user interface (UI) of the UE, a user response including at least a portion of the API analytics dataset.

In some aspects, the techniques described herein relate to a method further including: extracting API-specific metadata from each of the at least one API, wherein the API-specific metadata includes one or more of API identification (ID) information, directory information, and software-framework (SW-FW) information.

In some aspects, the techniques described herein relate to a method, wherein the user response for the at least one API includes information pertaining to one or more of: a vulnerability level for a respective API; a threat score for the respective API; a risk assessment level for the respective API; a priority score for the respective API; one or more software (SW) languages used for the respective API; a deployed framework for the respective API; user activity history for one or more users of the respective API; and test history data for the respective API.

In some aspects, the techniques described herein relate to a method, further including: storing API-specific data associated with the at least one API to a computing platform data store, wherein the API-specific data includes one or more of API-classification data, API-identification data, firmware (FW) data, and software (SW) data, and wherein the computing platform data store is communicatively coupled to the AI module; and periodically updating the computing platform data store using subsequent API analytics datasets received from the AI module.

In some aspects, the techniques described herein relate to a method, wherein, prior to displaying the user response, the method includes: generating a static portion of the user response using a user response template; generating a dynamic portion of the user response using the API analytics dataset; and synthesizing the static and dynamic portions of the user response to generate the user response for display on the UI of the UE.

In some aspects, the techniques described herein relate to a method, wherein, the plurality of SCRs include at least a first SCR and a second SCR, each of the first and the second SCRs include a plurality of repository files including one or more API-specific data files associated with one or more APIs and one or more non API files; and wherein extracting metadata analysis information from the each of the first and the second SCRs includes: identifying the one or more API-specific data files from the plurality of repository files, and extracting metadata associated with at least a portion of the plurality of repository files, including at least the one or more API-specific data files.

In some aspects, the techniques described herein relate to a method, wherein the first and the second SCRs include one or more differences related to one or more of: file directory organization; depth and breadth of file directories; available support for one or more of version control, intra-organization collaboration, inter-organization collaboration, access control, and authorization control; file naming conventions; file path conventions; and metadata information.

In some aspects, the techniques described herein relate to a method, wherein, the at least one API analytics dataset for the at least one API includes a plurality of API analytics datasets, including at least a first API analytics dataset for a first SCR and a second API analytics dataset for a second SCR, the first API analytics dataset is generated by selecting a first AI model and applying the first AI model to the first AI prompt, the second API analytics dataset is generated by selecting a second AI model and applying the second AI model to the second AI prompt, the first AI model is different from the second AI model, and the first AI prompt is different from the second AI prompt.

In some aspects, the techniques described herein relate to a method, wherein selection of the first and second AI models is based at least in part on the generated AI prompt and metadata analysis information for a respective one of the first and the second SCRs, and wherein the respective metadata analysis information for the first and the second SCRs includes one or more of: file-type ID information for a plurality of repository files stored in the respective SCR, and API classification information for each API stored in the respective SCR.

In some aspects, the techniques described herein relate to a method, wherein generating the AI prompt includes: parsing source code metadata from the at least one SCR; generating an initial AI prompt, based at least in part on parsing the source code metadata; identifying one or more limits or constraints imposed by the AI module on AI prompts; determining whether the initial AI prompt satisfies the one or more limits or constraints; and dynamically updating the initial AI prompt to generate a compliant AI prompt, based on determining that the initial AI prompt does not satisfy the one or more limits or constraints.

In some aspects, the techniques described herein relate to a method, wherein the generated AI prompt includes one of the initial AI prompt or the compliant AI prompt.

In some aspects, the techniques described herein relate to a method, wherein, prior to receiving the at least one API analytics dataset, the method includes: selecting, by the AI module, an AI model from a plurality of AI models; and applying, by the AI module, the selected AI model to the AI prompt to generate the API analytics dataset; and wherein the AI model is selected from a group consisting of a text-based model, a large language model (LLM), a machine-learning (ML) model, an artificial neural network (ANN) model, a decision tree model, a reinforcement learning model, and a transformer model.

In some aspects, the techniques described herein relate to a method, wherein displaying the user response includes displaying the API analytics dataset using one or more of: a graph, a summary report, a table, a risk assessment matrix, a risk assessment chart, a risk heat map, a vulnerability chart, a pie chart, and a bar graph.

In some aspects, the techniques described herein relate to a system configured for Application Programming Interface (API) detection and evaluation using a computing platform, the system including: one or more hardware processors configured by machine-readable instructions to: receive, from a user equipment (UE), one or more requests to analyze data stored across a plurality of SCRs, wherein, the one or more requests include authentication information for accessing each of the plurality of SCRs, and at least one of the plurality of SCRs includes data associated with at least one API; obtain access to at least one SCR of the plurality of SCRs, based on providing the respective authentication information to each of the plurality of SCRs; scan, based on obtaining access, the at least one SCR, wherein scanning the at least one SCR includes: analyzing a plurality of data files stored in the at least one SCR, extracting metadata analysis information from the at least one SCR, and identifying at least one API associated with the at least one SCR, based on analyzing the plurality of data files and extracting the metadata analysis information; generate an Artificial Intelligence (AI) prompt, based at least in part on extracting the metadata analysis information, wherein generating the AI prompt further includes transmitting the AI prompt to an AI module; receive, from the AI module, at least one API analytics dataset for the at least one API; and display, via a user interface (UI) of the UE, a user response including at least a portion of the API analytics dataset.

In some aspects, the techniques described herein relate to a system, wherein the one or more hardware processors are further configured by machine-readable instructions to: extract API-specific metadata from each of the at least one API, wherein the API-specific metadata includes one or more of API identification (ID) information, directory information, and software-framework (SW-FW) information.

In some aspects, the techniques described herein relate to a system, wherein, prior to displaying the user response, the one or more hardware processors are configured by machine-readable instructions to: generate a static portion of the user response using a user response template; generate a dynamic portion of the user response using the API analytics dataset; and synthesize the static and dynamic portions of the user response to generate the user response for display on the UI of the UE.

In some aspects, the techniques described herein relate to a system, wherein, the plurality of SCRs include at least a first SCR and a second SCR, each of the first and the second SCRs include a plurality of repository files including one or more API-specific data files associated with one or more APIs and one or more non API files; and wherein extracting metadata analysis information from the each of the first and the second SCRs includes: identifying the one or more API-specific data files from the plurality of repository files, and extracting metadata associated with at least a portion of the plurality of repository files, including at least the one or more API-specific data files.

In some aspects, the techniques described herein relate to a system, wherein generating the AI prompt includes: parsing source code metadata from the at least one SCR; generating an initial AI prompt, based at least in part on parsing the source code metadata; identifying one or more limits or constraints imposed by the AI module on AI prompts; determining whether the initial AI prompt satisfies the one or more limits or constraints; and dynamically updating the initial AI prompt to generate a compliant AI prompt, based on determining that the initial AI prompt does not satisfy the one or more limits or constraints.

In some aspects, the techniques described herein relate to a system, wherein prior to receiving the at least one API analytics dataset, the one or more hardware processors are configured by machine-readable instructions to: select an AI model from a plurality of AI models; and apply the selected AI model to the AI prompt to generate the API analytics dataset; and wherein the AI model is selected from a group consisting of a text-based model, a large language model (LLM), a machine-learning (ML) model, an artificial neural network (ANN) model, a decision tree model, a reinforcement learning model, and a transformer model.

In some aspects, the techniques described herein relate to a non-transient computer-readable storage medium having instructions embodied thereon, the instructions being executable by one or more processors to perform a method for Application Programming Interface (API) detection and evaluation using a computing platform, the method including: receiving, from a user equipment (UE), one or more requests to analyze data stored across a plurality of SCRs, wherein, the one or more requests include authentication information for accessing each of the plurality of SCRs, and at least one of the plurality of SCRs includes data associated with at least one API; obtaining access to at least one SCR of the plurality of SCRs, based on providing the respective authentication information to each of the plurality of SCRs; scanning, based on obtaining access, the at least one SCR, wherein scanning the at least one SCR includes: analyzing a plurality of data files stored in the at least one SCR, extracting metadata analysis information from the at least one SCR, and identifying at least one API associated with the at least one SCR, based on analyzing the plurality of data files and extracting the metadata analysis information; generating an Artificial Intelligence (AI) prompt, based at least in part on extracting the metadata analysis information, wherein generating the AI prompt further includes transmitting the AI prompt to an AI module; receiving, from the AI module, at least one API analytics dataset for the at least one API; and displaying, via a user interface (UI) of the UE, a user response including at least a portion of the API analytics dataset.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

DETAILED DESCRIPTION

Figure 1:
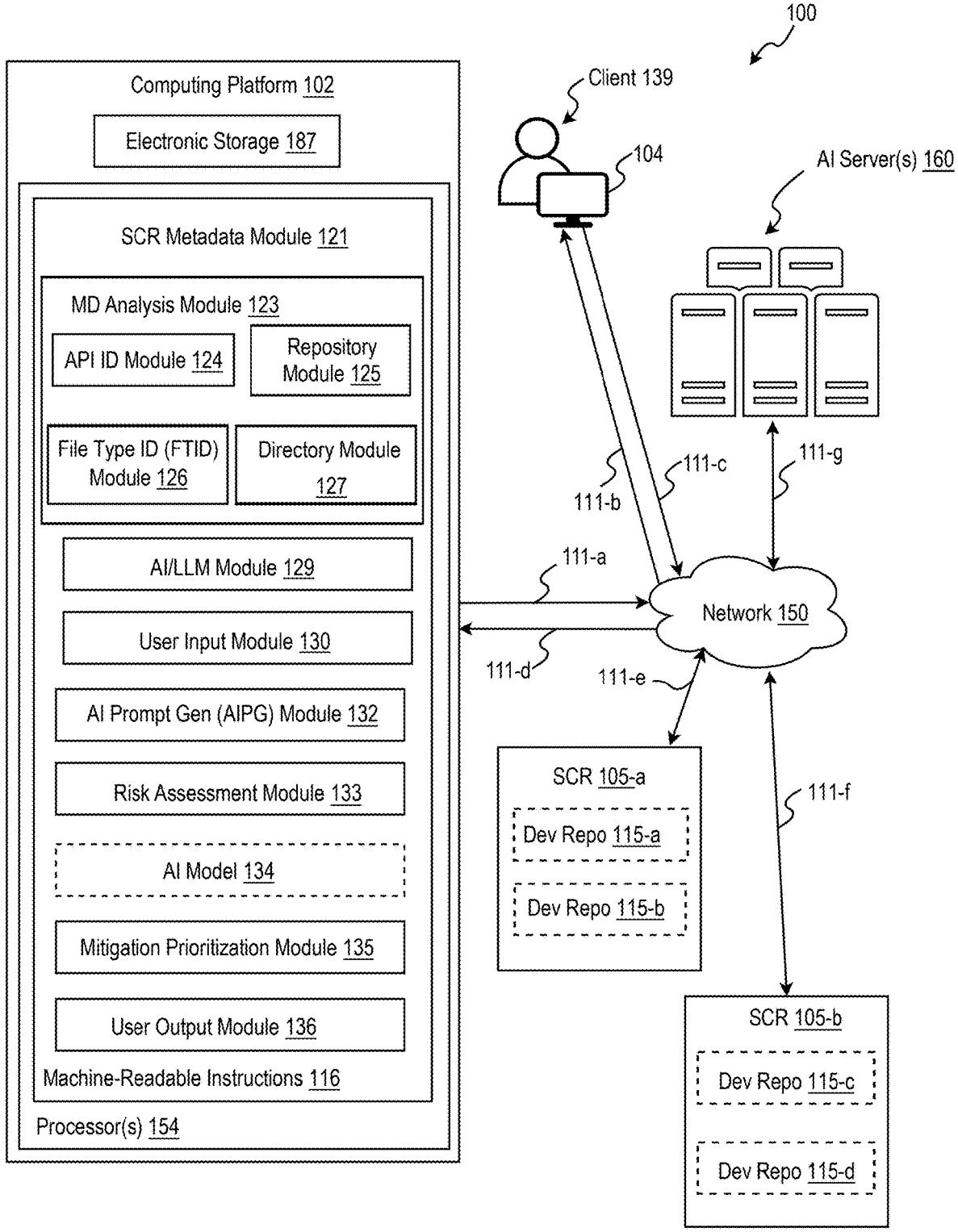
FIG. 1 illustrates a high-level block diagram of an AI-based API detection and evaluation system implemented using a computing platform, in accordance with various aspects of the disclosure.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The words "for example" is used herein to mean "serving as an example, instant, or illustration." Any embodiment described herein as "for example" or any related term is not necessarily to be construed as preferred or advantageous over other embodiments. Additionally, a reference to a "device", "computing device", "user device", or "mobile device" is not meant to be limiting to a single such device. It is contemplated that numerous devices may comprise a single "device" as described herein.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by optimized and enhanced items, however, the teaching of the present disclosure inherently discloses elements used in embodiments incorporating technology available at the time of this disclosure.

The detailed descriptions which follow are presented in part in terms of algorithms and symbolic representations of operations on data within a computer memory where such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved, which may include faster processing, lower power consumption due to the use of fewer computing resources, reduced latency, to name a few non-limiting examples.

In the descriptions herein, operations and manipulations are often described in terms, such as comparing, sorting, selecting, or adding, which are commonly associated with mental operations performed by a human operator. However, it should be understood that these terms are employed to provide a clear description of an embodiment of the present disclosure, and no human operator is necessary or even capable of performing all of the operations described herein.

This requirement for machine implementation for the practical application of the algorithms is understood by those persons of skill in this art as not a duplication of human thought, rather as significantly more than such human capability. Useful machines for performing the operations of one or more embodiments of the present disclosure include general purpose digital computers or other similar devices. In all cases, the distinction between the method operations in operating a computer and the method of computation itself should be recognized. One or more embodiments of the present disclosure relate to methods and apparatus for operating a computer in processing electrical or other (e.g., mechanical, chemical) physical signals to generate other desired physical manifestations or signals. The computer operates on software modules, which are collections of signals stored on a non-transient computer-readable storage medium that represent a series of machine instructions that enable the computer processor to perform the machine instructions that implement the algorithmic steps. Such machine instructions may be the actual computer code the processor interprets to implement the instructions or alternatively may be a higher-level coding of the instructions that is interpreted to obtain the actual computer code. The software module may also include a hardware component, where some aspects of the algorithm are performed by the circuitry itself rather than as a result of an instruction.

Some embodiments of the present disclosure rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

Some aspects of the present disclosure are directed to improving computer performance, at least with regards to API detection and evaluation across multiple repositories. Specifically, but without limitation, the metadata analysis technique described herein enables narrowing down the total number of files that need to be evaluated by filtering out numerous files that have a high likelihood of not being an API or related to an API (e.g., a file or source code that instantiates an API). As known in the art, commercially available repositories, such as GitHub, often contain dev repos for multiple clients, where each dev repo contains hundreds of files, folders, etc. As such, API detection and evaluation is not an easy task and cannot be performed manually or by a human operator in their mind and necessarily requires a specially programmed computer to perform the various operations of the disclosure described herein.

Furthermore, the real-time or substantially real-time requirement to generate and display API detection and evaluation results on a user device, based on meticulous analysis of the extracted metadata information from a repo containing hundreds of files, necessitates the use of a specially programmed machine or computer.

In the following description, several terms which are used frequently have specialized meanings in the present context.

In the description of embodiments herein, frequent use is made of the terms "server", "client", and "client/server architecture". In this context, each of a server and client is an instantiation of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that the client (e.g., user device) and server perform distinct, but complementary functions to accomplish a task or provide a service (e.g., AI-based API detection and evaluation in source code repositories (SCRs)), which can help enhance API security, identify both active and inactive APIs across a plurality of SCRs, discover API vulnerabilities (e.g., due to their inactive state for a significant period of time), and provide mitigation strategies for reducing or minimizing a threat level for the APIs stored across the multiple SCRs. The client and server accomplish this by exchanging data, messages, and often state information using a computer network, or multiple networks. It should be appreciated that in a client/server architecture for distributed computing, there are typically multiple servers and multiple clients (e.g., user devices, which may be configured to connect to the internet using wired and/or wireless communication technologies), and they do not map to each other and further there may be more servers than clients or more clients than servers. A server is typically designed to interact with multiple clients (e.g., client devices, mobile devices, user devices, tablet computers, UEs). In some cases, the system of the present disclosure may be configured to support (or be used with) client devices utilizing different communication protocols (e.g., mobile data, mobile hotspot, ethernet, Wi-Fi, or any other communication protocols known or contemplated in the art), different operating systems and/or different versions of operating systems (e.g., Windows 11, Windows 10, Android, IOS, mac OS, MAC OS X, different variants of Linux, Ubuntu, and different variants of operating systems that are specific to tablets). Additionally, client devices may or may not include a video camera and/or an audio input device (e.g., microphone, headset, or earbuds with a built-in microphone), but the system may nonetheless be compatible with a wide range of client devices known or contemplated in the art.

Structurally, a code repository is a versioned collection of nested files and directories not unlike a file directory. In some cases, the system may be configured to read metadata from a source code repository, a specialized service for storing and organizing software code (e.g., GitHub, bitbucket), evaluate the metadata to identify APIs, and prioritize the detected APIs for further security actions.

In some cases, the system 100 may be designed to allow a user (e.g., a customer or client) to access the system through a web application user interface (UI), a dedicated downloadable application, or any other applicable means known or contemplated in the art. The customer can provide an address and credentials (e.g., username, password, multifactor authentication (MFA) information) for a source code repository (SCR). The embodiment would then "read" the source code and/or metadata, analyze the data using advanced language tools (e.g., large language models (LLMs), Natural Language Processing (NLP) models, etc.) to generate a score for the likelihood that different parts of the source code are web applications, determine which software frameworks are employed, and/or whether they contain/instantiate APIs. The analysis could also evaluate and rate the degree and severity of security risks exhibited by various parts of the source code (e.g., different APIs). The results of these analyses would then be presented to the user through the UI and also stored for further and deeper query and analysis.

In networks, bi-directional data communication (i.e., traffic) often occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium using a wired means of communication (e.g., ethernet, coax, fiber optic, Digital Subscriber Line or DSL), or a wireless means of communication (e.g., Wi-Fi using an IEEE 802.11 protocol, such as 802.11n, 802.11ac, 802.11ax, and even future proposed protocols, including 802.11be (or Wi-Fi 7) and 802.11bn (or Wi-Fi 8)). Other types of communication technologies that may be supported by the computing platform (e.g., computing platform 102) may include Wi-Max, satellite-based internet, and any other applicable wired or wireless communication technologies known or contemplated in the art. Today, a significant amount of wireless data communication also takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD). Thus, any of 2G, 3G, 4G, and/or 5G cellular communications are supported by the disclosed computing platform(s), including at least computing platform 102 and 502 in FIGS. 1 and 5, respectively.

As used herein, a source code repository (also referred to as a repository, or SCR) is a secure storage system for software source code, which can then be built into a running application such as an Application Programming Interface (API). Typically, SCRs have a structure resembling a file directory. Some SCRs may also include special functions and services that can be used to support version control, collaboration (e.g., across different teams, users, departments in an organization, etc.), and access control (e.g., what portion of the repository, data files, etc., is a particular user allowed to access, which may be based on their title, designation, authorization rules, username and credentials information, to name a few) for software owners and developers alike. In some cases, a SCR may contain one or more directories. Additionally, directories within the repository (or SCR) may include files which contain software code, tests (e.g., test code for evaluating API functionality, test results collected after executing/running a specific test), documentation (e.g., internal documents provided to all software developers, internal documents provided to all managers, and/or any other relevant and applicable documents), and any other applicable files (e.g., a $3^{rd}$ party software program, training materials, etc.) needed to facilitate the development and operation of the software contained therein. In some examples, repository services (e.g., GitHub) may not only store code, but they may also serve as external or third-party backups in case an event erases critical software data that is stored on-prem (e.g., software hosted on a server located within an organization's physical premises). In other words, the software and hardware may be installed and run locally, rather than a remote facility, in which case a SCR may be used to back-up the locally stored code. In some instances, a SCR may also be used to capture and store additional information about users and their activity within the repository.

Repositories (or SCRs) typically include a collection of data known as "metadata", which may include file names and file paths associated with the directory structure implemented in the SCR. It should be noted that metadata information is distinct from the content of the files stored within the repository (or SCR). There are multiple commercial providers of source code repositories, such as GitHub. However, it should be understood that the API-detection and evaluation system (e.g., system 100 in FIG. 1) can be configured to work with different SCRs besides GitHub, including SCRs using different directory organizations, file organizations, file naming conventions, and/or file path conventions, to name a few non-limiting examples. Additionally, or alternatively, the system (e.g., system 102, system 502) of the present disclosure can be configured to work with repositories that vary in their breadth and depth, which are terms used in the art to refer to the tree-like organization of file directories. For example, a "broad repository" may refer to a SCR that is more top heavy (i.e., more directories are located near the top of the tree-structure as compared to the bottom of the tree-structure). In contrast, a "deep repository" may refer to a SCR comprising a plurality of nested directories within its tree-structure. In some other cases, a SCR may be both broad and deep. Regardless of the type of tree-structure of the directories, as well as use and extent of nested directories, aspects of the present disclosure are configured to work with numerous types of SCRs utilizing different directory organization variations known or contemplated in the art.

FIG. 1 illustrates a block diagram of an Artificial Intelligence (AI)-based API detection and evaluation system 100 implemented using a computing platform, in accordance with various aspects of the present disclosure. In some implementations, the AI-based API detection and evaluation system 100 (or simply, system 100) may include one or more computing platform(s) 102. Computing platform(s) 102 may be configured to communicate with one or more remote platforms (e.g., UE 104, SCR 105-a, SCR 105-b, AI server(s) 160) using comm links 111-a, 111-b, 111-c, 111-d, 111-e, 111-f, and/or 111-g. In other cases, the computing platform 102 may communicate with the one or more remote platforms according to a client/server architecture, a peer-to-peer architecture, and/or other architectures. Remote platform(s) may be configured to communicate with other remote platforms via computing platform 102 and/or according to a client/server architecture, network 150, a peer-to-peer architecture, and/or other applicable architectures. In some embodiments, users (e.g., a client user 139) may access system 100 via a UE 104 (e.g., a laptop). In some examples, the terms "user equipment", "UE", "remote computing platform", "remote platform", "user device", and "computing device" may be used interchangeably throughout the disclosure. Some non-limiting examples of remote platform(s) and UEs include laptops, desktop computers, smartphones, and/or computer tablets.

Computing platform 102 may include electronic storage 187. Additionally, computing platform 102 may be configured by machine-readable instructions 116. Machine-readable instructions 116 may include one or more instruction modules. The instruction modules may include computer program modules. The instruction modules may include one or more of a SCR metadata module 121 (or a SCR module 121), an AI/LLM module 129, a user input module 130, an AI prompt generation module 132 (or AIPG module 132), a risk assessment module 133, an AI model 134 (shown as optional by the dashed lines), a mitigation prioritization module 135, a user output module 136 (or a user response module 136), and/or other instruction modules. In this example, the SCR metadata module 121 further includes a metadata (MD) analysis module 123, where the MD analysis module 123 includes an API Identification (ID) module 124, a repository module 125, a file type ID module 126 (or FTID module 126), and/or a directory module 127. It should be noted that one or more of the instruction modules described herein may be optional. Alternatively, in some embodiments, a single instruction module may be utilized to effectuate the functions of a plurality of instruction modules.

In some instances, this description may refer to a hypothetical "user" who employs one or more embodiments of this disclosure as a tool for application or API security. The user (e.g., client user 139) may refer to any person responsible for API or application security of software code stored in one or more repositories (or SCRs). Typically, this hypothetical user, such as client 139, may be an individual skilled in the art of application or API security and may be an authorized agent of the entity (e.g., organization, company, a specific team within a large organization, etc.) that is responsible for the development and maintenance of the API's software code, which may include performing periodic threat evaluations and assessments, determining any API vulnerabilities, developing risk mitigation strategies based on a risk level/score for vulnerable APIs, determining a priority score that can be used to prioritize deployment of fixes or patches to the software code, where the priority score may be based on the risk level/score for each API, vulnerability level for each API, as well as the extent and implications of the threat posed by the vulnerable APIs to the entity as a whole. For example, a threat assessment of the API may include evaluating the software framework (or software-framework information), directory organization, and/or file organization within directories of the SCR hosting the API. In some cases, a SCR may have a known vulnerability, e.g., due to the type of software framework (SW-FW) and directories used, which can adversely impact any software code, API-specific data files, APIs, documentation, etc., hosted on the SCR. In such cases, if the threat or risk posed by the known vulnerability is deemed a high priority (e.g., if the threshold score/level is above a predefined score/level), the system of the present disclosure may flag an API hosted on that SCR to help ensure that the client user 139 prioritizes the development and/or deployment of any patches or fixes to mitigate the risk posed by the known vulnerability. Alternatively, if the threat or risk posed by the known or detected vulnerability (e.g., detected based on the metadata analysis information associated with the SCR) is critical or extreme, the system 100 may be configured to suggest migrating the API data files, as well as other sensitive data files, from a first SCR (e.g., SCR 105-*a*) to a second, different SCR (e.g., SCR 105-*b*) with a significantly lower threat and assessment score.

As noted above, entities, such as software developers, organizations, etc., may store software code in a variety of manners. For example, an entity may store all its software code locally (i.e., on hardware, servers, etc., located on-prem) and use one or more SCRs for back-up purposes. In other cases, a portion of the software code associated with an entity may be stored on-prem, while the remainder may be stored in the cloud, or in one or more SCRs. In yet other cases, an entity may store all of its software code, which may include application or API-specific code, across a plurality of SCRs that can communicate via a network (e.g., network 150).

In accordance with various aspects of the present disclosure, the computing platform 102 may be configured to perform a plurality of operations. Some non-limiting examples of such operations may include a scanning operation, an analysis operation, a prompt generation operation, a risk assessment operation, a prioritization operation, a presentation or display operation, and/or a monitoring operation.

As used herein, scanning involves capturing relevant information (e.g., metadata information from the SCR, which may include metadata information associated with both API and non-API files) from a SCR, such as SCR 105-*a*. In this example, the SCR 105-*a* includes a plurality of development repositories (e.g., a first development repository 115-*a* that contains APIs, API-specific data files, software code associated with the APIs, to name a few non-limiting examples; and a second development repository 115-*b* that contains a mix of API and non-API related files). In this example, the system 100 further includes another SCR 105-*b*, where the SCR 105-*b* is different from SCR 105-*a*. In some circumstances, the differences for the two SCRs may result from differences in one or more of: a breadth of each SCR, a depth of each SCR, type of repository (e.g., broad repository, deep repository, a combined repository that is both broad and deep), a file directory structure, a directory structure, the use (or lack thereof) of nested directories, directory and/or file organization implemented by each SCR, software languages used by each SCR, software frameworks employed by each SCR, number of file directories deployed on, or hosted by each SCR, a number of APIs and API-specific data files hosted on each SCR, and/or a ratio of the number of API-specific data files to non-API files for each SCR. As used herein, the ratio of the number of API-specific data files to non-API files for a SCR may not only encompass the absolute number of API-specific data files to non-API files (e.g., 110 API-specific datafiles to 967 non-API files), but may also include the total storage capacity used by the API-specific data files to non-API files (e.g., 26 GB to 31 GB) on the SCR.

Following scanning the one or more SCRs, the system of the present disclosure may be configured to analyze the scanned metadata to detect and evaluate APIs hosted on the one or more SCRs.

Next, the presentation operation may include presenting some or all of the results obtained from the scanning operation to the client user 133 through a UI display (e.g., shown as UI 287 in FIG. 2) of the UE 104. In some embodiments, the system 100 is also configured to store the scanned results to electronic storage 187 and/or a computing platform data store (e.g., shown as platform data store 201 in FIG. 2), which allows for additional query and analysis.

As used herein, monitoring (e.g., shown as continuous monitoring 297) includes automated, ongoing detection of changes (e.g., software updates) in the one or more SCRs, which can help ensure that knowledge of APIs and their vulnerabilities remains accurate over time. In some embodiments, the system 100 may be configured to trigger relevant actions, such as, but not limited to, alerting the client user 139 via the UI of the UE 104, thereby helping support optimal API or application security practices, as compared to prior art systems.

Scanning begins with providing the computing platform 102 with access to a code repository. Once the computing platform 102 has access to this repository, a scan can be initiated. This causes the computing platform 102 to read the repository metadata. Reading the metadata is a nontrivial challenge, as some repositories can be huge with many thousands of files. Repositories also vary in their breadth and depth, terms that refer to the tree-like organization of the file directories. A broad repository has many directories near the top of the tree. A deep repository has many nested directories within the tree. Some repositories can be both broad and deep.

An embodiment of this disclosure reads the source code metadata and composes it into a suitable input for analysis. In some embodiments, the analysis is performed by a service that could be a text-based model such as a large language model. In other embodiments it could be a custom machine learning model that takes text of other data as an input. Without loss of generality, this analytical input may be referred to as an AI prompt, or simply prompt. The algorithms and services used for analysis impose limits on the amount of information (e.g., number of words, characters, etc.) that can be contained in the prompt. To address this limitation, some aspects of the present disclosure are directed to a mechanism to dynamically optimize the prompt for maximum information content within the constraints imposed by the methods of analysis. For example, the platform 102 might first try to compose a prompt with all available metadata and then check if this is within the constraints of the current analytical service. If not, it would make a second attempt, preferentially capturing the repository breadth while sacrificing some of the deeper files, and so on, until the prompt is within the constraints.

Some aspects of the present disclosure may also include logic to exclude information that is known to be irrelevant to the intended purposes. A common example is a file type, as identified by its file extension in the metadata, that is not correlated with whether the containing code is an API. This step could entail parsing or reading a list of file names or extensions, and identifying those that can be ignored based on the file name or extension. Additionally, or alternatively, the computing platform 102 may employ a service that exposes one or more machine learning (ML) models that can be specifically trained to recognize such files (i.e., distinguish API related files from non-API files).

The resulting prompt is then presented to an analytics service that can classify files. The analytics service (e.g., AI server 160) may be a unique, locally hosted model or it could be an external service such as a large language model (LLM) called via a specific API. The analytical service (e.g., AI servers 160 in FIG. 1) then returns results (e.g., AI analytics data 294). In some embodiments, the AI analytics data 294 may be transmitted to the platform data store 201 and the user output module 236. The AI analytics data 294 (also referred to as API analytics dataset 294, or AI-generated API analytics dataset 294) can be used to determine API classifications for various components of the repository. This classification could be a probability or a rating that the code is a web app. The analysis may also return additional output information including software languages, frameworks, and technologies in use and whether any portions of the repository include OpenAPI, an open standard for API description, documentation.

Another function of the scanning analysis may include evaluating how vulnerable a given detected API built from the source code may be. The analysis may help evaluate information such as the software frameworks employed, as there are known vulnerabilities for most frameworks, the commit and security (scan or test) histories and user activity histories for the repo. This threat evaluation can then be presented to the user as a priority score to help guide the users actions in addressing these results.

After scanning, the corpus of data comprising the analysis output is stored and presented in whole or in part to the user, described in further detail below. Some elements of the analytics data 294 could be reported through the UI 287, providing an overview or summary 288 of the detected APIs and their vulnerability priority to the user or users. The client 139 can query additional information and details from the system 100 using the UI 287, in some embodiments. Furthermore, this additional information/details can be stored in the electronic storage 187 (or platform data store 201) and made available for optimizing the capabilities of one or more embodiments of the present disclosure.

After the repository has been scanned, the computing platform or a module (e.g., MD analysis module 123) includes capabilities to continuously monitor (e.g., 297 in FIG. 2) the repository to maintain current and accurate information about APIs and associated information. In some embodiments, monitoring can be facilitated by a system that detects certain changes to the repository and publishes messages through a messaging system (e.g., messaging module 339). The messaging system, which may be a feature of the repository provider or a service inherent to the disclosure, publishes notifications about changes and a current status of the repository that can trigger follow-up actions such as complete or partial scans, customer notifications, automated threat mitigation actions, etc.

User input module 130 may be configured to receive, from the UE 104, one or more requests to analyze data stored across a plurality of SCRs. The requests to analyze data may be transmitted over network 150 using communication links 111-c and 111-d. In some embodiments, the one or more requests may include authentication information for accessing each of the plurality of SCRs, such as SCR 105-a and SCR 105-b.

SCR metadata module 121 may be configured to obtain access to at least one SCR 105 (e.g., SCR 105-a and/or SCR 105-b) of the plurality of SCRs 105, based on providing the respective authentication information to each of the plurality of SCRs 105. For example, the computing platform 102 may receive first authentication information (e.g., a first username, a first password) for accessing the repository files stored in SCR 105-a, and second authentication information for accessing the repository files stored in SCR 105-b. In some examples, the first and second authentication information may be received from the UE 104 over network 150 and using communication links 111-c and 111-d, as illustrated in FIG. 1. In this example, SCR 105-a comprises a first dev repository 115-a and a second dev repository 115-b, while SCR 105-b comprises a third dev repository 115-c and a fourth dev repository 115-d. In some embodiments, each of the dev repositories 115-a through 115-d may be used to store repository files. Additionally, at least one of the plurality of SCRs 105-a, 105-b may comprise data associated with at least one API (not shown).

Metadata (MD) analysis module 123 may comprise a plurality of sub-modules, as shown in FIG. 1. For example, MD analysis module 124 may comprise an API ID module 124, a repository module 125, a file type ID module 126, and a directory module 127.

Repository module 125 may be configured to scan the plurality of SCRs 105-*a*, 105-*b*, based on obtaining access to the plurality of SCRs 105. In some embodiments, scanning a SCR, such as SCR 105-*a*, comprises analyzing a plurality of data files stored in the SCR. For example, repository module 125 of the MD analysis module 123 may be configured to analyze a plurality of data files (or repository files) stored in dev repositories 115-*a*, 115-*b*, 115-*c*, and/or 115-*d*.

MD analysis module 123 may be configured to extract metadata analysis information from the at least one SCR (e.g., SCR 105-*a*, SCR 105-*b*). As used herein, metadata analysis information may refer to metadata that is extracted for further analysis, used to generate an Artificial Intelligence (AI) prompt, or a combination thereof.

API ID module 124 may be configured to identify at least one API associated with the at least one SCR. As an example, API ID module 124 may be configured to utilize the scanning information received from repository module 125 and/or the extracted metadata analysis information received from the MD analysis module 123 to detect at least one API in SCR 105-*a* or SCR 105-*b*. Furthermore, the API ID module 124 may also be configured to identify API classification information for each API stored in a SCR.

In some embodiments, the MD analysis module 123 may be further configured to extract API-specific metadata from each of the at least one API, where the API-specific metadata comprises one or more of API ID information, directory information, software information, and/or framework information. For example, the directory module 127 may be configured to identify the directory information for each of the first SCR 105-*a* and second SCR 105-*b*. Additionally, the directory module 127 may also identify the directory information for dev repositories 115-*a*, 115-*b*, 115-*c*, and/or 115-*d*.

File type ID module 126 may be configured to identify file-type identification (FTID) information for a plurality of repository files stored in the plurality of SCRs. For instance, the respective metadata analysis information for each of the first SCR 105-*a* and the second SCR 105-*b* may comprise file-type ID information for a plurality of repository files stored in the respective SCR. In such cases, the file type ID module 126 may identify the file-type ID information for the plurality of repository files from the metadata analysis information.

AI prompt generation (AIPG) module 132 may be configured to generate an AI prompt, based at least in part on extracting the metadata analysis information (e.g., by the MD analysis module 123). In some examples, the AIPG module 132 may be further configured to transmit the AI prompt to an AI module. In some cases, the AI module may comprise the AI/LLM module 129 of the computing platform 102. In other cases, the AI module may be a part of the AI server 160 (or AI service 160), where the AI server 160 may be a 3$^{rd}$ party server. In some embodiments, the AI/LLM module 129 may comprise the AI model 134. Alternatively, the AI/LLM module 129 may be separate and distinct from the AI model 134. Some non-limiting examples of the AI model 134 may include a text-based model, a large language model (LLM), a machine-learning (ML) model, an artificial neural network (ANN) model, a decision tree model, a reinforcement learning model, and a transformer model. Other types of AI models known or contemplated in the art can be utilized in different embodiments.

In some embodiments, the AI server 160 may comprise a plurality of AI models, including at least AI model 134, and may be configured to select an appropriate AI model that should be applied to the AI prompt. In such cases, the AIPG module 132 may be configured to transmit the generated AI prompt over network 150 to the AI server 160 using communication links 111-*a* and 111-*g*.

AI/LLM module 129 of the computing platform 102 may be configured to read the metadata associated with the source code (i.e., stored in SCR 105-*a* and SCR 105-*b*) and compose it into a suitable input (e.g., adhering to a pre-defined format) for analysis by the AI Prompt Gen Module 132 (or AIPG module 132), AI module 134, and/or the AI server 160. In some examples, the AI/LLM module 129 and the AIPG module 132 may be configured to work in conjunction to generate the AI prompt sent to the AI server 160.

The AI server 160 may utilize one or more AI models for analyzing the AI prompt received from the computing platform 102. In some embodiments, the analysis may be performed by an AI model/service that may be a text-based model, such as a large language model (LLM). However, it should be noted that other models besides LLMs can be utilized in different embodiments and the example listed herein is not intended to limit the scope and/or spirit of the present disclosure. For instance, in some cases, the AI model of the AI server 160 may comprise a custom machine learning (ML) model that is configured to take text from other data sources as an input.

In some embodiments of the disclosure, the AI model utilized for analyzing the AI prompt containing the source code metadata may be implemented within the computing platform 102, as opposed to a third-party AI service (e.g., AI server 160). In such cases, the AI server(s) 160 may be optional. Alternatively, the AI model 134 of the computing platform may be a first type of AI model, such as a custom ML model, while the AI server(s) 160 may comprise a LLM model, a natural language processing (NLP) model, and any other applicable AI model. In such cases, the AI model 134 of the computing platform and the AI model of the AI server 160 may be used in conjunction with each other to generate the analysis results/reports displayed on UE 104. In other cases, the AI model 134 and an AI model of the AI server 160 may be individually applied to the same AI prompt to determine whether their results align with each other. If they do not align, the AI server 160 may apply different AI models to the same AI prompt, which can help determine if any of the AI models need to be updated or discarded.

In some instances, the algorithms and services, i.e., implemented on the AI server(s) 160 may impose limits or constraints on the amount of information (e.g., <500 kB, <50 MB, <1 GB, to name a few non-limiting examples), number of words or characters, as well as the type of information (e.g., metadata-specific information, API-specific information, metadata information associated with an API, etc.) that may be included within the AI prompt transmitted to the AI server 160. In such cases, one or more of the AI/LLM module 129 and the AIPG module 132 may be configured to dynamically optimize the initial AI prompt (e.g., an initial version of the AI prompt that comprises all or a majority of the extracted metadata) such that a maximum amount of relevant information and content is included within the AI prompt transmitted to the AI server 160, while also ensuring that the transmitted AI prompt adheres to the AI server imposed constraints. In one non-limiting example, the AIPG module 132 may first try to compose an AI prompt (i.e., initial AI prompt) with all available metadata and then determine whether the initial AI prompt is within the constraints of the current analytical service (e.g., a first AI server 160). If not, the AIPG module 132 may be configured to generate an updated version of the initial AI prompt, herein referred to as a compliant AI prompt, by sacrificing/leaving out at least a portion of the metadata from the AI prompt. In the above example, the AIPG module 132 may be configured to sacrifice or remove some of the deeper files, while capturing most or all of the repository breadth. In some aspects, the AI prompt modification process described above may be repeated until the AI prompt transmitted to the AI server 160 complies with the corresponding constraints imposed by the AI server 160.

Similarly, some aspects of the present disclosure may include logic to exclude information that is known to be irrelevant to the intended purpose (e.g., detecting and evaluating APIs hosted on code repositories for enhancing API/application security). One non-limiting example of such information may comprise a file type, as identified by its file extension in the metadata, as this information may not always be indicative of whether the software code is an API. In such cases, the electronic storage 187 (or alternatively, the platform datastore 201 described in relation to FIG. 2) may be used to store a list of file names or file extensions that can be ignored, based on the lack of any link or relation of such file extensions to APIs. Additionally, or alternatively, the AI model 134 may be trained to recognize such files that have limited to no links with APIs. In such cases, the AI model 134 may work in conjunction with the MD analysis module 123 and its sub-modules to accurately identify APIs and other files related to APIs, while ignoring non-API related files. Such a design can help optimize the generation of the AI prompt transmitted to the AI service or server, which in turn can enhance the quality, accuracy, and delivery speed of the API analytics dataset(s) received from the AI server 160. In some embodiments, the AI server 160 can also classify files, e.g., in lieu of, or in addition to the various modules of the computing platform 102.

The SCR metadata module 121 (or another applicable module, such as the AI/LLM module 129) is configured to receive API analytics data from the AI server 160, where the AI server 160 generates and returns the API analytics data in response to receiving the AI prompt and applying at least one AI model to the AI prompt. In some instances, the AI server 160 may also be referred to as an analytical service. In one non-limiting example, the analytical service may be configured to return results which include classifications for various components of the different SCRs associated with the client. In some cases, the classification provided by the AI server 160 or analytical service may comprise a probability or a rating (e.g., on a scale of 1 to 10, with 1 being the least likely and 10 being the most likely) that a particular repository file or source code stored in a SCR is an API (or related to an API) or entirely unrelated to an API. In one non-limiting example, the classification may include a probability or a rating that a particular source code is a web app. In some cases, the analytical service (or AI server 160) may be configured to return additional output information, such as, but not limited to, software language(s), framework(s), and technologies in use at each of the plurality of repositories (e.g., SCRs 105-*a*, 105-*b*; dev repos 115-*a* through 115-*d*). In some examples, the SCR analysis may also include information regarding whether a repository includes or implements OpenAPI, which is an open standard for API description and documentation.

The risk assessment module 133 may be configured to evaluate a risk level, threat level, vulnerability level, etc., for a detected API, based on the API analytics data received from the AI server 160. In some circumstances, the vulnerability of a given detected API may be based in part on the underlying source code. Thus, some aspects of the present disclosure may comprise evaluating how vulnerable a detected API built from the source code may be to external threats or actors. In some embodiments, this evaluation is based on assessing information related to the software frameworks employed at the corresponding SCR (i.e., where the detected API resides). Considering that there are known vulnerabilities for most software frameworks, assessing such information may help provide additional insight into the overall risk posed by a vulnerable API to the client. Additional information, such as, but not limited to, commit and security (scan or test) histories and user activity histories (e.g., identified using the user activities and scan histories module 241 in FIG. 2) for the SCR or a particular dev repo within the SCR may also be evaluated to perform risk assessment and threat evaluation, in accordance with various aspects of the present disclosure.

Mitigation prioritization module 135 may be configured to synthesize the risk assessment and threat evaluation information received from the risk assessment module 133 to determine a priority score for each API detected in the plurality of SCRs. In some cases, an API may be vulnerable to multiple risks, each risk associated with a different priority score. The mitigation prioritization module 135 may be configured to generate an overview or summary of the detected APIs and their vulnerability priority score which can be presented to the client 139 via the UI of the user device 104. In some embodiments, the mitigation prioritization module 135 is also configured to determine one or more mitigation strategies (e.g., deleting a long defunct API, updating the API using software security patches, automated threat mitigation actions, etc.) to minimize or reduce a risk level for the client organization due to the presence of one or more vulnerable APIs.

The user output module 136 may be configured to present the threat evaluation and risk assessment results to the user/client 139, for instance, via a UI of the UE 104. In some embodiments, the user output module 136 is configured to display, via the UI of the UE, a user response including at least a portion of the API analytics dataset. As noted above, the threat evaluation and risk assessment can be presented to the user/client as a priority score, or through any other applicable means, such as graphs, pie charts, risk matrices, etc. For instance, in some cases, displaying the user response comprises displaying the API analytics dataset (or AI-generated API analytics dataset) using one or more of a graph, a summary report, a table, a risk assessment matrix, a risk assessment chart, a risk heat map, a vulnerability chart, a pie chart, and a bar graph.

In some embodiments, the user response for the at least one API comprises information pertaining to one or more of (1) a vulnerability level for a respective API, (2) a threat score for the respective API, (3) a risk assessment level for the respective API, (4) a priority score for the respective API, (5) one or more software (SW) languages used for the respective API, (5) a deployed framework for the respective API, (6) user activity history for one or more users of the respective API, and/or (7) test history data for the respective API. In some examples, a user activities and scan histories module 241 may be configured to determine information pertaining to (6) and (7) noted above.

In accordance with aspects of the disclosure, each of the system 100, the computing platform (e.g., computing platform(s) 102), UEs (e.g., any of the UEs 104, 204, and/or 304 in FIGS. 1-3), as well as other applicable systems, servers, platforms, computing devices, data stores, and/or databases can be implemented using a respective computer system (also referred to as a computing system). One non-limiting example of such a computer system may include the computer system 600 described below in relation to FIG. 6. In some instances, a plurality of computer systems (or different variants of the computer system) can be employed to effectuate the various aspects of the present disclosure. Additionally, one or more subcomponents (e.g., input device(s) 633, output device(s) 634, storage 608, operating system 609, etc.) of the different computer systems may be different (e.g., configured differently), for instance, depending on the functionality of the specific computer system (e.g., whether the computer system is a user device, an AI server, an AI server providing an analytics service, etc.).

In one non-limiting example, computer systems of the same type (e.g., user device) may utilize different operating systems (e.g., WINDOWS, MAC, LINUX, ANDROID, etc.), APIs or applications, storage devices (e.g., magnetic disk drives, solid-state drives), network interfaces (e.g., ethernet, Wi-Fi, 4G or 5G cellular technology), to name a few non-limiting examples. In other words, the system 100 of the present disclosure may be an example of a cross-platform computer system that is configured to operate with disparate computer systems using disparate hardware components, software systems (e.g., BIOS, OS, applications), and/or networking technology to detect and evaluate APIs across a plurality of SCRs, in accordance with various implementations.

In some implementations, computing platform(s) 102, remote computing platform(s) (e.g., UE 104), and/or external resources (e.g., SCRs 105-*a*, 105-*b*; AI server(s) 160) may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which computing platform(s) 102, remote platform(s), and/or external resources may be operatively linked via some other communication media.

A given remote platform (e.g., UE 104, AI server(s) 160, SCR 105-*a*, SCR 105-*b*) may include one or more processors configured to execute computer program modules. The computer program modules may be configured to enable an expert or user associated with the given remote platform to interface with system 100 and/or external resources, and/or provide other functionality attributed herein to the remote platform(s). By way of non-limiting example, a given remote platform (e.g., UE 104, AI server(s) 160, SCR 105-*a*, SCR 105-*b*) and/or a given computing platform 102 may include one or more of a server, a desktop computer, a laptop computer, a handheld computer, a tablet computing platform, a Netbook, a Smartphone, and/or any other applicable computing platform.

External resources may include sources of information outside of system 100, external entities participating with system 100, and/or other resources. In some implementations, some or all of the functionality attributed herein to external resources may be provided by resources included in system 100. Some non-limiting examples of external resources may comprise SCRs 105 (e.g., SCR 105-*a*, SCR 105-*b*) and AI server(s) 160.

Computing platform(s) 102 may include electronic storage 187, one or more processors 154, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 187 may comprise non-transitory storage media that electronically stores information. The electronic storage media of electronic storage 187 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 187 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 187 may include one or more virtual storage resources (e.g., cloud storage, a virtual private network, and/or other virtual storage resources). Electronic storage 187 may store software algorithms, information determined by processor(s) 154, information received from computing platform(s) 102, information received from remote platform(s), and/or other information that enables computing platform(s) 102 to function as described herein.

Processor(s) 154 may be configured to provide information processing capabilities in computing platform(s) 102. As such, processor(s) 154 may include one or more of a digital processor, an analog processor, a digital circuit designed to process information, an analog circuit designed to process information, a state machine, and/or other mechanisms for electronically processing information. Although processor(s) 154 is shown in FIG. 1 as a single entity, this is for illustrative purposes only. In some implementations, processor(s) 154 may include a plurality of processing units. These processing units may be physically located within the same device, or processor(s) 154 may represent processing functionality of a plurality of devices operating in coordination. Processor(s) 154 may be configured to execute modules 121, 123, 124, 125, 126, 127, 129, 130, 132, 133, 134, 135, 136, and/or other modules. For instance, processor(s) 154 may be configured to execute modules 121, 123, 124, 125, 126, 127, 129, 130, 132, 133, 134, 135, 136, and/or other modules by software; hardware; firmware; some combination of software, hardware, and/or firmware; and/or other mechanisms for configuring processing capabilities on processor(s) 154. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 121, 123, 124, 125, 126, 127, 129, 130, 132, 133, 134, 135, and/or 136 are illustrated in FIG. 1 as being implemented within a single processing unit, in implementations in which processor(s) 154 includes multiple processing units, one or more of modules 121, 123, 124, 125, 126, 127, 129, 130, 132, 133, 134, 135, and/or 136 may be implemented remotely from the other modules. The description of the functionality provided by the different modules 121, 123, 124, 125, 126, 127, 129, 130, 132, 133, 134, 135, and/or 136 described below is for illustrative purposes, and is not intended to be limiting, as any of modules 121, 123, 124, 125, 126, 127, 129, 130, 132, 133, 134, 135, and/or 136 may provide more or less functionality than is described. For example, one or more of modules and/or may be eliminated, and some or all of its functionality may be provided by other ones of modules and/or. As another example, processor(s) 154 may be configured to execute one or more additional modules that may perform some or all of the functionality attributed below to one of modules 121, 123, 124, 125, 126, 127, 129, 130, 132, 133, 134, 135, and/or 136.

Figure 2:
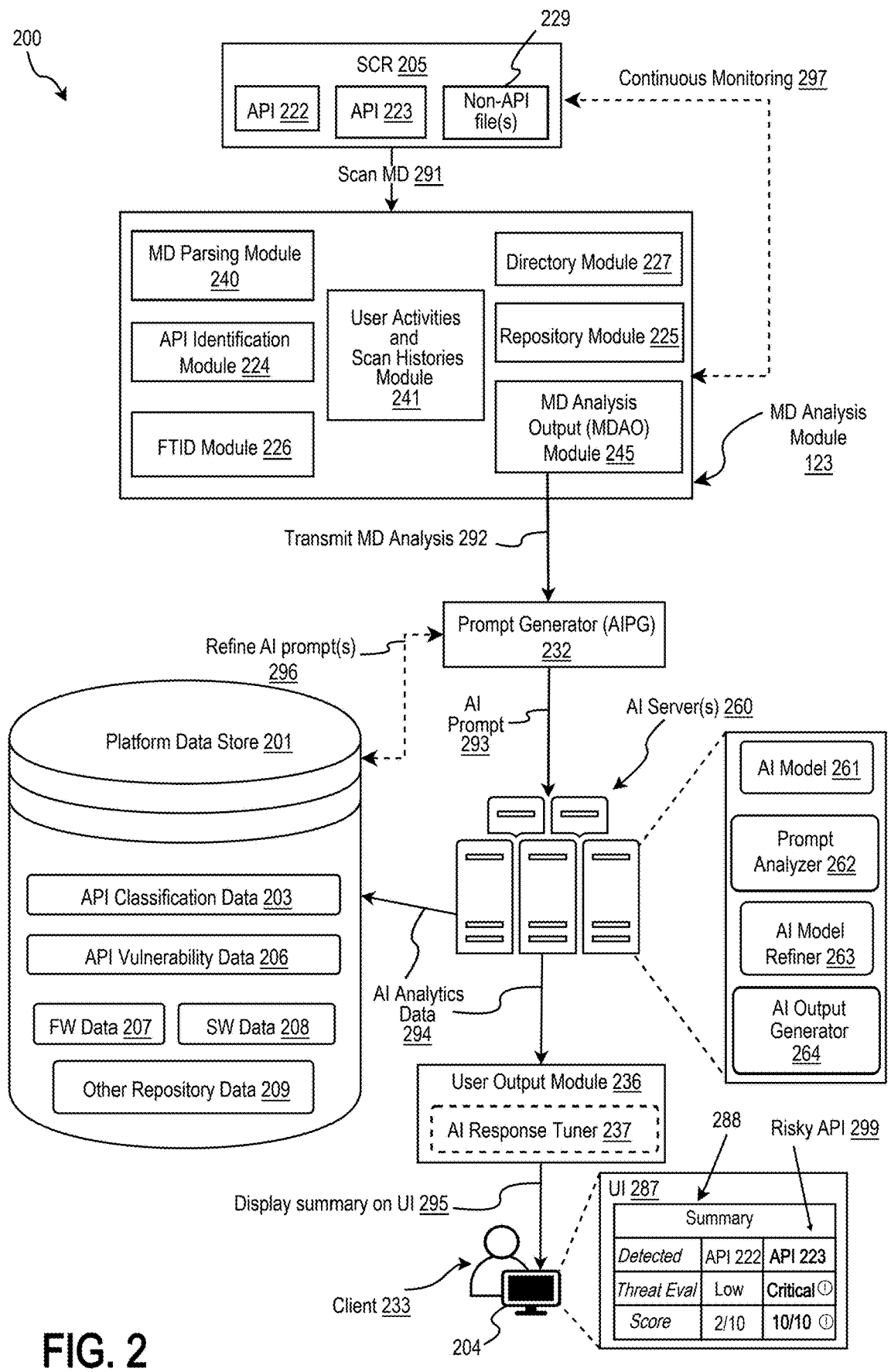
FIG. 2 illustrates an example of a process flow associated with the AI-based API detection and evaluation system in FIG. 1, in accordance with various aspects of the disclosure.

Turning now to FIG. 2, which illustrates an example of a process flow 200, according to various aspects of the disclosure. FIG. 2 illustrates a source code repository (SCR) 205, where the SCR 205 comprises a first API 222, a second API 223, and one or more non-API files 229. The SCR 205 may implement one or more aspects of the SCRs 105 described in relation to FIG. 1.

As shown, the MD analysis module 123 is configured to scan the SCR 205, where the scanning (291) comprises analyzing a plurality of data files stored in the SCR 205, extracting metadata analysis information from the SCR 205, and identifying at least one API (e.g., API 222, API 223) associated with the at least one SCR 205. In some embodiments, identifying the at least one API associated with the SCR 205 is based on analyzing the plurality of data files (e.g., repository files stored in the SCR 205, data files associated with APIs 222 and 223, non-API files 229, to name a few non-limiting examples) and extracting the relevant metadata analysis information from the SCR 205.

The information obtained from scanning the metadata of the SCR is analyzed by the various sub-modules of the MD analysis module 123. For example, MD parsing module 240 is configured to parse/read the source code metadata. API identification module 224 is configured to identify an API ID for each of the detected APIs (e.g., APIs 222, 223).

FTID module 226 may be configured to identify a file type for the plurality of repository files (i.e., files related to or comprising APIs 222, 223, and the non-API files 229) stored in the SCR 205. In some embodiments, the system (e.g., system 100 in FIG. 1) may include logic to exclude information that is known (or highly likely) to be irrelevant to the purpose of API detection and threat evaluation. In some instances, identifying a file type for the plurality of repository files may assist in excluding such extraneous information, thereby improving the ability of a computer to detect and evaluate APIs stored in repositories, as compared to the prior art. For example, identifying a file type for a particular repository file may be based at least in part on identifying the file extension for the particular repository file using the metadata associated with that file. In this way, aspects of the present disclosure can assist in optimizing computing performance, as well as the rate at which API detection and evaluation can be performed by employing modules, such as, the API ID module 224 and FTID module 226 to filter out any non-API related files (e.g., files having a non-API file extension). In other words, the FTID module 226 can be employed to identify the file type for a particular file using its metadata information, as the metadata information can be used to identify the file extension for the particular file, which can then be used to separate APIs and API-related files from non-API files. In some aspects, the file extension information gleaned from the metadata captured from the SCR 205 can provide insight into whether the software code contained within a file is an API or not.

In some embodiments, the directory module 227 may be similar or substantially similar to the directory module 127 described in relation to FIG. 1. In some instances, the directory module 227 may be configured to identify the directory information for the SCR 205. As previously described, a SCR, such as SCR 205, is a secure storage system for software source code, which is then built into a running application such as an API (e.g., API 222, API 223). In some examples, SCRs may have a structure like a file directory, akin to a file directory on a computer. Furthermore, some SCRs, such as SCR 205, may include special functions and services that support version control, collaboration (e.g., intra-organization collaboration, inter-organization collaboration), and access control, among others, for software owners and developers. In some cases, directories within SCR 205 may include files which contain software code, tests, and/or documentation which may be needed to facilitate the development and operation of the software contained therein. Thus, in some aspects, the directory module 227 helps determine the file directory structure implemented on the SCR 205, where determining the file directory structure may include determining a breadth and depth of the file directory associated with SCR 205. While not necessary, some file directories may be organized as a "tree-like" structure, and may be associated with certain attributes (i.e., breadth, depth) that can help provide a high-level view of the files hosted by the SCR 205. In some instances, a SCR or repository may be referred to as a broad repository if its respective directories are concentrated towards the top of the "tree". In some other cases, a SCR or repository may be classified as a deep repository if it includes numerous nested directories within the "tree". In yet other cases, a repository can implement aspects of both broad and deep repositories, which can be identified by the directory module 227 using the scanned metadata (291).

The repository module 225 may be similar or substantially similar to the repository module 125 described in relation to FIG. 1. In some embodiments, the repository module 225 may be configured to scan the SCR 205 based on obtaining access to the SCR, e.g., by providing authentication information or credentials to gain access to the SCR 205. In some embodiments, scanning the SCR 205 comprises analyzing a plurality of data files stored in the SCR. For example, repository module 225 of the MD analysis module 123 may be configured to analyze a plurality of data files (or repository files) stored in dev repositories (e.g., shown as dev repo(s) 115-a, 115-b, 115-c, and/or 115-d in FIG. 1). While FIG. 2 only illustrates APIs 222, 223, and non-API file(s) 229, it should be appreciated that the actual directory and file structure(s) deployed by enterprises, organizations, governmental agencies, universities, etc., can be incredibly complex as they can include tens of thousands of files, including both API and non-API files. Some aspects of the present disclosure are related to optimizing API discovery through the use of metadata analysis information and AI prompts, which can help speed up API discovery by reducing the complexity and resource intensive nature associated with current API detection techniques. In this way, the present disclosure can help enhance application security, as compared to the prior art.

API discovery, the process of identifying and monitoring APIs, is a critical function in effective application security. APIs must be identified so that proper security practices can be applied and enforced to secure them. The current state of the art in API discovery includes network traffic analysis and/or API management platforms. Network traffic analysis may comprise installing a software program to capture and analyze network traffic, which can help identify active APIs. Furthermore, API management platforms may be used to maintain a list of APIs and information about said APIs that can be used to evaluate them for their security. However, a major deficiency or weakness of such API management platforms is due to their extensive reliance on the information provided by the software developers. Said another way, the weakness of these API management platforms results from the "currency" of their information, as they can only be as good as the information that they receive (e.g., information provided by the software developer). Accordingly, if new APIs are added to a repository and adequate/relevant information pertaining to the API is not transmitted to the API management platform, those new APIs may be "invisible" and therefore insufficiently secure to threats posed by external entities. Thus, as described above, current techniques for API discovery are generally limited to active APIs receiving network traffic and often require a software developer to manually input information related to a recently added API into an API management platform. As such, a refined technique is needed for API discovery and evaluation that can help mitigate some or all of the deficiencies, as compared to the prior art.

For instance, there are a large number of unused, yet accessible, APIs that go undetected using currently used API discovery techniques. In other words, current techniques for API discovery, especially of neglected, forgotten, or unused APIs, are lagging in several regards, due to a combination of the technique used (e.g., analysis of network traffic) and the limited functionality provided by most $3^{rd}$ party API management platforms. This neglect of unused or now defunct APIs can pose significant security risks as a large majority of them can still be accessed by a $3^{rd}$ party (e.g., a malicious actor). Furthermore, if an unused and accessible API includes critical vulnerabilities, the security risks posed by such a neglected API is amplified as a malicious actor can exploit the vulnerabilities of the neglected API to (1) cause the API to divulge private data, and/or (2) gain unauthorized access to internal systems, as well as other sections/portions of the repository, which can have severe security implications on the organization as a whole.

Thus, in some aspects, the repository module 225 (or another applicable module) can be configured to provide the authentication information received from the client 233 to the SCR 205 to obtain access to the various files, directories, APIs, etc., associated with the SCR 205. This in turn enables the repository module 225 to scan or read metadata from the SCR 205.

The MD analysis output (MDAO) module 245 can be used to read, extract, and organize the repository metadata and provide metadata analysis information (292) to the AI prompt generator 232. The AI prompt generator 232 can be similar or substantially similar to the AIPG module 132 described above in relation to FIG. 1.

The AIPG generator 232 may be configured to generate and transmit an AI prompt 293 to an AI server 260, where the AI prompt 293 comprises at least a portion of the metadata analysis information (292) received from the MD analysis module 123.

In some examples, the initial AI prompt generated by the AIPG 293 can be refined (296) based on information related to previous AI prompts stored in the platform data store 201. In this way, the information stored in the platform data store 201 can be used to fine-tune and refine AI prompts over time, which enhances the quality of the information (e.g., AI analytics data 294) provided by the AI server 260. In some cases, the AI server 260 implements one or more aspects of the AI server 160 described in relation to FIG. 1. Further, the AI server 260 can be configured to utilize at least one AI model (e.g., AI model 261) to generate the AI analytics data 294. In some embodiments, generating the AI analytics data 294 is based at least in part on analyzing the received AI prompt 293 using the prompt analyzer 262, selecting an appropriate AI model 261 based on analyzing the AI prompt 293, and applying the AI model 261 to the AI prompt 293. As shown in FIG. 2, the AI server 260 can further comprise an AI model refiner 263 for updating/fine-tuning the AI model(s) utilized by the AI server 260, where updating or fine-tuning the AI model 261 may be based on feedback received from one or more modules of the computing platform (e.g., computing platform 102 in FIG. 1).

As shown in FIG. 2, the AI server 260 can also comprise an AI output generator 264, where the AI output generator 264 is configured to generate and transmit the AI analytics data 294 to a user output module 236 and the platform data store 201. In some embodiments, the platform data store 201 is configured to store API classification data 203, API vulnerability data 206, firmware data 207, software data 208, and/or other repository data 209. The platform data store 201 (or alternatively, the API identification module 224) can be used to store API-identification data. In some cases, the data stored in the platform data store 201 may include the AI analytics data 294 (e.g., API analytics dataset(s) 294), as well as any other applicable data received from the MD analysis module 123 and other modules of the computing platform (e.g., computing platform 102 in FIG. 1). Furthermore, in some embodiments, the computing platform data store 201 may be periodically updated using subsequent API analytics datasets received from the AI server(s) 260.

In one non-limiting example, the AI analytics data 294 may include a score for the likelihood that various parts of the source code in the SCR 205 are web applications. In other cases, the AI analytics data 294 may include information related to the software framework employed by the SCR 205, as well as whether it contains or instantiates any APIs. Furthermore, the AI analytics data 294 may also include a summary, a report, a graph, etc., that conveys information that can help the client 233 evaluate the degree, severity, or security risk exhibited by the various parts of the source code (e.g., source code associated with APIs).

As illustrated, the user output module 236 is configured to receive AI analytics 294 from the AI server 260 and incorporate it into a form that can be presented to the client 233 via the UI 287 of the computing device 204. In one non-limiting example, the user output module 236 may comprise an AI response tuner 237 that modifies or updates the AI analytics data 294, for instance, based on user or client preferences. In other cases, the AI analytics data 294 may be received in a form that is ready to display on the computing device 204. As shown, the user output module 236 transmits a message (295) to the user device 204, where the message includes at least a summary 288 of the API detection and evaluation for the SCR 205. In some instances, the summary 288 is displayed on the UI 287 of the user device 204. In this example, the summary 288 is displayed in the form of a table having a plurality of rows (e.g., detected API, threat evaluation information for each API, a priority score for each API) and a plurality of columns (e.g., one column for each API). In this example, the summary 288 can be easily used to identify that API 223 is considered to be a risky API 299 (e.g., an API that poses significant security risks, such as an API whose priority score, risk assessment score, threat evaluation, and/or vulnerability level exceeds a pre-defined threshold).

Figure 3:
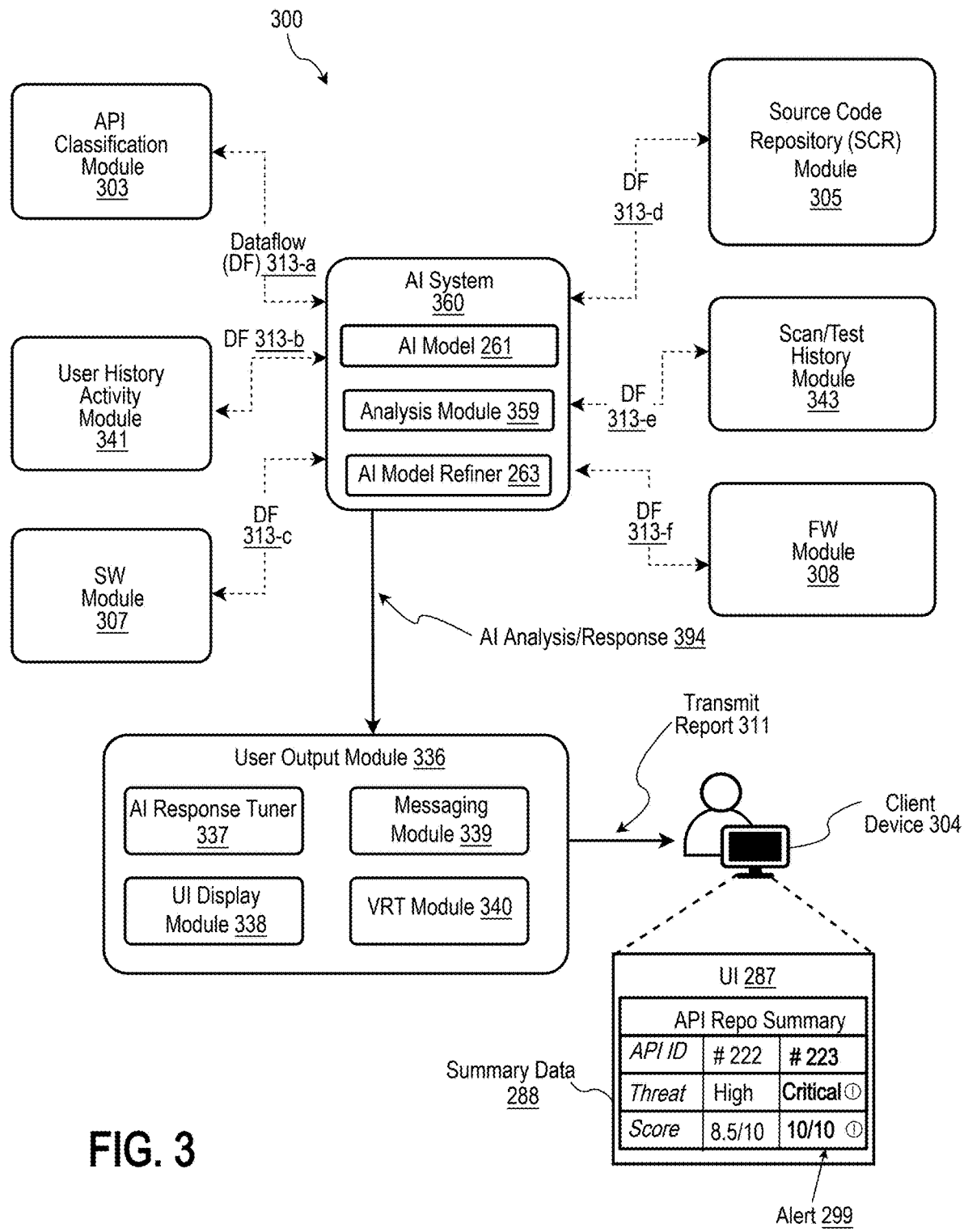
FIG. 3 illustrates another example of a process flow associated with the AI-based API detection and evaluation system in FIG. 1, in accordance with various aspects of the disclosure.

FIG. 3 illustrates another example of a process flow 300, in accordance with various aspects of the present disclosure. As shown, FIG. 3 depicts an AI system 360 (also shown as AI servers 160, 260 in FIGS. 1 and 2) comprising an AI model 261, an analysis module 359, and an AI model refiner 263. The AI system 360 is electrically, logically, and/or communicatively coupled to various modules of the computing platform (e.g., computing platform 102). Additionally, the AI system 360 is configured to exchange information with the API classification module 303 using dataflow (DF) 313-a, user history activity module 341 using DF 313-b, software (SW) module 307 using DF 313-c, SCR module 305 using DF 313-d, scan/test history module 343 using DF 313-e, and/or FW module 308 using DF 313-f. In some embodiments, the user history activity module 341 and scan/test history module 343 may be implemented as a single module, such as the user activities and scan histories module 241 shown in FIG. 2.

In some embodiments, the AI model 261 and AI model refiner 263 may be similar or substantially similar to those previously described in relation to FIG. 2.

In some examples, the analysis module 359 of the AI system 360 may be configured to analyze the AI prompt to determine API classifications for various components of the SCR, such as SCR 205 in FIG. 2. Furthermore, the AI system 360 may communicate, using DF 313-a, the API classification information to the API classification module 303. The API classification module 303 may be configured to store the information pertaining to the determined API classifications or relay the API classification information to the platform data store (e.g., platform data store 201).

In some embodiments, the analysis module 359 may be configured to determine and output other types of information, including information related to software languages used and software frameworks used. For example, the SW module 307 may receive information pertaining to the software languages used, an indication of whether the code is linked to an API, and any other applicable software-related information from the AI system 360 using DF 313-c. Similarly, the FW module 308 may receive information pertaining to the software frameworks employed in the repo from the AI system 360 using DF 313-f. The software and framework related information can be used to evaluate how vulnerable a given detected API built from the source may be. In some instances, the analysis module 359 may evaluate information related to the software frameworks employed in the repo, as there are known vulnerabilities for most frameworks. Furthermore, the analysis module 359 may also evaluate information related to the commit and security (scan or test) histories and provide a scan/test history analysis to the scan/test history module 343 using DF 313-e. Additionally, the analysis module 359 may also evaluate information related to the user activity histories for the repo and provide user history activity analysis information to the user history activity module 341 using DF 313-b. In some embodiments, the SCR module 305 may also be configured to receive repo-specific analysis information, for instance, information pertaining to the technologies in use at the repo and whether any portions of the repo include OpenAPI. As previously noted, OpenAPI refers to an open standard for API description and/or documentation.

Thus, in some aspects, the various analyses performed by the analysis module 359 can be used to generate an AI analysis/response 394, where the response 394 includes information pertaining to one or more of a list of detected APIs, a threat evaluation for each API, a priority score for each API, a risk assessment score for each API, a risk assessment matrix for the detected APIs, software languages used in the repo, software frameworks employed at the repo, and any other applicable information that can help guide the users actions in addressing the analysis results.

In some cases, the AI analysis/response 394 is transmitted to a user output module 336, which may be similar or substantially similar to the user output module 136 described in relation to FIG. 1. In this example, the user output module 336 comprises an AI response tuner 337 (shown as AI response tuner 237 in FIG. 2), a UI display module 338, a messaging module 339, and a vulnerability-threat-risk (VRT) module 340.

In some embodiments, the AI analysis/response 394 may also be transmitted to a platform datastore (e.g., platform datastore 201 in FIG. 2) of the system. Furthermore, the AI analysis/response 394 may be presented in whole or in part to the user (e.g., user associated with client device 304), shown as transmit report 311. In some embodiments, one or more elements (e.g., API ID, Threat, Priority Score) of the data may be reported through the UI 287. For instance, UI 287 displays an overview or summary data 288 for the detected APIs, where the summary data 288 is presented as a table and includes an API ID, a threat level, and a priority score for each of the detected APIs. It should be noted that the summary data 288 depicted in FIGS. 2-3 is exemplary only and the type of information conveyed by the summary data 288 is not intended to limit the scope and/or spirit of the present disclosure. In this way, the AI system 360 along with the various modules depicted in FIG. 3 can be used to generate and transmit a report (311) to the client device 304, where the transmitted report can be used to provide an overview or summary of the detected APIs and their vulnerability priority to the user(s).

In some aspects of the present disclosure, the system may be configured to provide additional information and details to the user or client based on receiving one or more queries. For example, the client device 304 can transmit a query request to obtain additional information and details related to the API having API ID #223, based on its threat level (Critical) and priority score (10/10).

In some examples, the AI response tuner 337 is configured to make one or more modifications to the AI analysis/response 394, which may be based on client or user preferences and/or identifying any grammatical or formatting errors, to name two non-limiting examples. The UI display module 338 is configured to synthesize the AI analysis/response 394, along with any modifications made by the AI response tuner 337, into a user-friendly format that can be displayed on the client device 304. In some instances, the UI display module 338 may also be configured to modify the AI analysis/response, for example, based on the operating system (OS) of the client device, type of client device 304 (e.g., a smartphone, a tablet, or a laptop), whether user is using an app or a web browser, web browser being used (if applicable), and/or any pre-defined preferences (e.g., accessibility, high contrast, dark theme, text or font size, etc.) to ensure that the summary data 288 is properly formatted for display on the UI of the client device 304, which can help enhance user experience.

In some examples, the messaging module 339 may be configured to transmit the report (311) to the client device 304. Additionally, or alternatively, the messaging message module 339 may be configured to receive one or more queries for additional information and details from the client device 304. In such cases, the messaging module 339 can relay the queries to the appropriate modules (e.g., user history activity module 341, scan/test history module 343, mitigation prioritization module 135, etc.), receive one or more responses to the user queries, and then relay those responses to the client device 304.

In some embodiments, the VRT module 340 may be configured to generate an alert (e.g., alert related to risky or vulnerable API 299) based on one or more of the vulnerability level of a detected API, a threat evaluation of the detected API, and a risk assessment of the detected API. In some cases, the VRT module may work in conjunction with one or more of the AI response tuner 337 and the UI display module 338 to ensure that the summary data 288 is displayed in a manner that allows the user/client to easily identify vulnerable APIs, e.g., through the use of bold font, a specific font color, larger font size, highlighted text, and/or specific icons (e.g., an exclamation mark, a danger sign).

In some embodiments, the UI display module 338 and the AI response tuner 337 may be implemented as a single module.

Figure 5A:
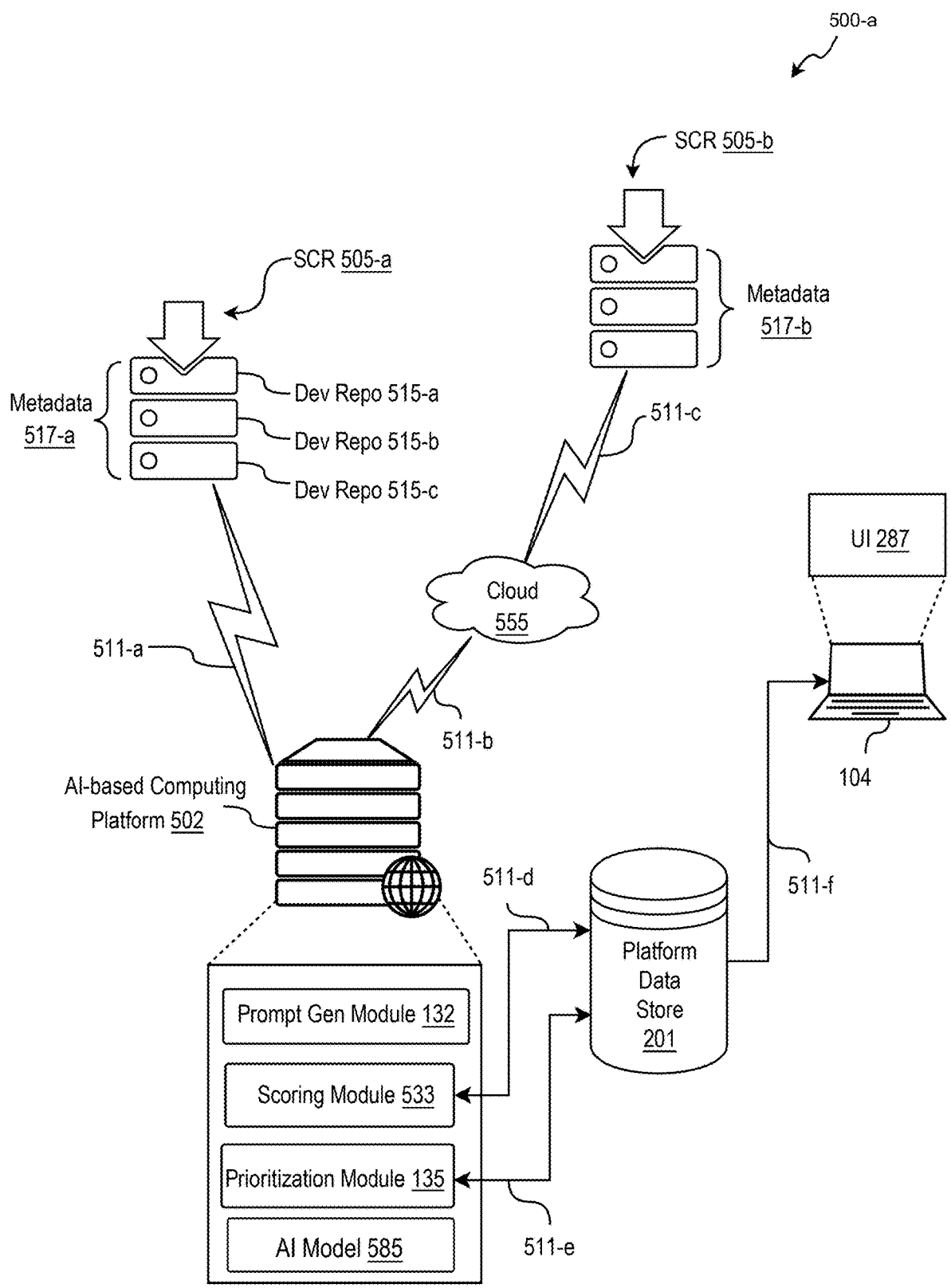
FIG. 5A illustrates a block diagram of an AI-based API detection and evaluation system, in accordance with various aspects of the disclosure.

FIG. 5A illustrates a block diagram 500-$a$ of an AI-based API detection and evaluation system, in accordance with various aspects of the disclosure. The AI-based API detection and evaluation system may implement one or more aspects of the system 100 described above in relation to FIG. 1.

As seen in FIG. 5A, the system (500) comprises an AI-based computing platform 502, a platform data store 201, a user device 104 configured to display a UI 287, a first SCR 505-$a$, and a second SCR 505-$b$. In this example, the AI-based computing platform 502 is similar or substantially similar to the computing platform 102 described in relation to FIG. 1. Additionally, the platform data store 201, user device 104, prompt generation module 132, scoring module 533, prioritization module 135, and AI model 585 are similar or substantially similar to the corresponding ones described herein and elsewhere throughout the disclosure. In one non-limiting example, the scoring module 533 may implement one or more aspects of the risk assessment module 133, mitigation prioritization module 135, and user output module 136 described in relation to FIG. 1. Furthermore, the scoring module 533 may also implement aspects of the prompt analyzer 262 and AI output generator 264 described in relation to FIG. 2. For instance, AI model 585 may implement one or more aspects of the AI model 134 and/or AI model 261 described in relation to FIGS. 1 and/or 2, respectively. In some examples, the SCRs 505 (e.g., SCR 505-$a$, SCR 505-$b$) may implement one or more aspects of the SCRs 105 and/or SCR 205 described in relation to FIGS. 1 and/or 2, respectively.

The AI-based computing platform 502 may be in direct communication with SCR 505-$a$ using communication link 511-$a$, which may be a wired or wireless communication link. Additionally, the AI-based computing platform 502 may communicate with SCR 505-$b$ over a cloud network 555, for instance, using communication links 511-$b$ and 511-$c$.

As shown, the SCR 505-$a$ comprises a plurality of development repositories (dev repos), including a first dev repo 515-$a$, a second dev repo 515-$b$, and a third dev repo 515-$c$. A dev repo is a storage location for software code and other files used by software developers. Furthermore, dev repos allow software developers to manage changes to their software code (e.g., API-specific code), collaborate on projects, and track changes (e.g., version control, code tracking). In some instances, dev repo metadata (e.g., metadata 517-$a$) refers to data that can be used to describe a repository (e.g., repo 515-$a$), including its name, owner, creation date, information about the code, and/or services associated with the repo. In some cases, metadata 517-$a$ can be used to classify data files into categories, for instance, whether a data file is associated with an API. Specifically, but without limitation, the dev repo metadata extracted from dev repos 515-$a$ through 515-$c$ can be parsed and evaluated to detect files or code that classify as APIs, or alternatively, can be employed to instantiate APIs.

As described in relation to FIG. 1, the computing platform 502 receives the address (e.g., IP address, network address) and authorization information for accessing a SCR (e.g., SCR 505-$a$, SCR 505-$b$) as an input from the user device 104. Next, the AI-based computing platform 502 (or any of its modules) is configured to read, extract, and organize the repository metadata 517-$a$, which then serves as an appropriate input (e.g., AI prompt) for further analysis. In this case, both the AI prompt generation module 132 and the AI model 585 are installed or hosted on the same AI-based computing platform 502. In some other cases, the AI model 585 may be associated with and hosted on a separate $3^{rd}$ party platform (e.g., AI server 160 in FIG. 1).

In either case, the prompt generation module 132 is configured to generate an AI prompt, based on parsing and reading the source code metadata (e.g., metadata 517-$a$ and/or metadata 517-$b$) and identifying any constraints (e.g., word limit, character limit) imposed by the AI model, which helps ensure that the most relevant details from the metadata(s) 517 are incorporated into the AI prompt. In some examples, the prompt generation module 132 is configured to dynamically optimize an AI prompt (e.g., if the initial AI prompt does not meet the pre-defined constraints) and generate an updated version of the AI prompt by removing at least a portion of the metadata included in the initial AI prompt. In some embodiments, the prompt generation 132 classifies the extracted metadata into distinct categories (e.g., high importance, medium important, low importance) based on their relevance or importance with regards to API detection and evaluation, in accordance with various aspects of the disclosure.

In some cases, the AI prompt (e.g., shown as AI prompt 293 in FIG. 2) generated by the prompt generation module 132 is analyzed to generate the appropriate results (e.g., API classifications, software languages used, framework used, technologies in use, whether the repo includes OpenAPI, priority score for each API, a vulnerability level for each API) that can be sent to the client device 104 and displayed using the UI 287. In this case, the AI model 585 may be applied to the AI prompt to generate the results requested by the client. In some cases, the AI-based computing platform 502 can transmit the analysis results to the platform data store 201. For example, the scoring module 133 may communicate the risk or vulnerability score (i.e., calculated by applying the AI model 585 to the AI prompt) to the data store 201 using communication link 511-$d$. Similarly, the prioritization module 135 may communicate the priority score to the platform data store 201 using communication link 511-$e$. Next, the AI-based computing platform 502, or alternatively, the platform data store 201 may communicate (e.g., using communication link 511-$f$) an overview or summary of the API detection, evaluation, and threat analysis to the user device 104 for display on UI 287. In some instances, the summary or overview (e.g., shown as summary 288 in FIG. 2) may be presented or displayed using one or more of a text-based report, a table, a graph, a pie chart, a risk assessment matrix, or a combination thereof. Furthermore, the selected format (e.g., text-based, or visual) may be based on a user or client preference, or alternatively one or more attributes of the user device 104. As an example, a quick text-based summary may be more appropriate if the user or client is accessing the API results using a smartphone, while a text-based summary combined with graphs, charts, etc., may be more appropriate if the user is accessing the results using a laptop or desktop computer.

Figure 5B:
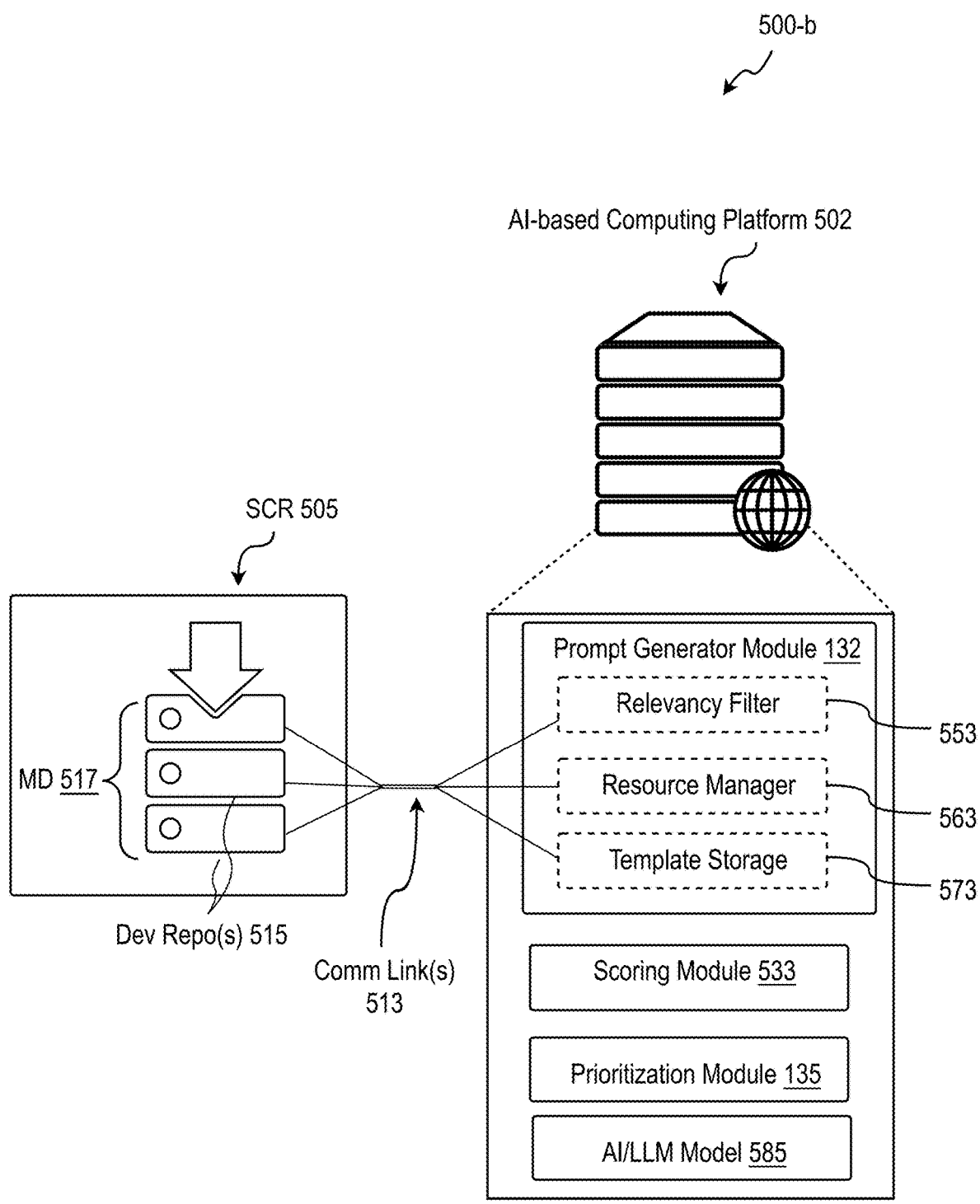
FIG. 5B illustrates a detailed view of a source code repository (SCR) and the system in FIG. 5A, in accordance with various aspects of the disclosure.

FIG. 5B illustrates a detailed view 500-b of a SCR 505 and the AI-based computing platform 502 in FIG. 5A, in accordance with various aspects of the disclosure. The AI-based computing platform 502 may be similar or substantially similar to the computing platform 102 described in relation to FIG. 1.

As seen in this detailed view, the prompt generator module 132 of the AI-based computing platform 502 comprises a relevancy filter 553, resource manager 563, and template storage 573. The AI-based computing platform 502 further comprises the scoring module 533, prioritization module 135, and AI/LLM model 585, which may be similar or substantially similar to the ones described with reference to FIG. 5B and elsewhere throughout the disclosure.

FIG. 5B also depicts a SCR 505, including its dev repo(s) 515 and the metadata 517 associated with the SCR 505. In this example, each dev repo 515 is linked (shown by communication links 513) to each one of the relevancy filter 553, resource manager 563, and template storage 573.

In some embodiments, the MD 517 of the SCR 505 may include information pertaining to one or more of a number of commits over a given timeframe, frequent committers, file names, folder paths, etc., that can help identify all or a majority of the scannable applications built from the source code.

The prompt generation module 132 may be configured to read the MD 517 and generate an AI prompt. In some examples, the scoring module 533 can access the generated AI prompt. Additionally, or alternatively, the AI/LLM model 585 can be applied to the AI prompt to generate the AI analysis/response that can be transmitted to the client/user device.

In some cases, the relevancy filter 553 of the AI prompt generator module 132 can be configured to filter out any metadata that may be of little importance or inconsequential to the scoring module 533. Some non-limiting examples of metadata that can be filtered out by the relevancy filter 553 may include file extensions and commits over a certain date threshold. In some embodiments, AI-based computing platform 502 (or any of its modules) may also track or store the excluded metadata for further review, which can be used to update and fine-tune the relevancy filter 553 (if needed).

SCRs, such as SCR 505, are typically unbounded collections of data. Additionally, in some circumstances, multiple resource constraints may be imposed on the scoring module 533. Some non-limiting examples of resource constraints may include size limits on network requests, a word limit, a character limit, and/or a limit on the number of metadata words/tokens. Resource manager 563 is configured to analyze the incoming and filtered metadata (e.g., filtered by relevancy filter 553, or filtered while scanning the repo or SCR 505) and compare its attributes/properties to pre-defined resource boundaries to ensure that the AI prompt includes at least the most relevant/important metadata. This helps ensure that the AI analysis results (e.g., AI analytics data 294) are accurate and meet pre-defined quality standards. In some circumstances, the extracted metadata may exceed a resource limit or constraint, in which case the resource manager 563 reduces the scope of the metadata using various logic to try to keep the most relevant and important portions of the metadata for the other components (e.g., scoring module 533, prioritization module 135, AI/LLM model 585) of the AI-based computing platform 502.

As previously noted, the AI prompts discussed herein are part static data (e.g., a template) and part dynamic data (e.g., repo metadata 517). In some embodiments, the template storage 573 stores the static data (i.e., the template), and supports manual editing (i.e., includes manual editing capabilities). In some embodiments, generating the user response including at least a portion of the API analytics dataset may include (1) generating a static portion of the user response using a user response template, (2) generating a dynamic portion of the user response using the API analytics dataset, and (3) synthesizing the static and dynamic portions of the user response to generate the user response for display on the UI (e.g., UI 287) of the UE (e.g., UE 204). The template storage 573 may also include versioning and testing functionality. Such a design allows multiple versions of an AI prompt to be evaluated and compared using their respective test results/data to determine an optimal version of the AI prompt. In other cases, different versions of the template can be evaluated using the same AI prompt to identify an optimal template. Following testing of prompt templates and/or AI prompts, one or more prompt templates may be published for use. In some examples, published prompt templates may be read by the prompt generator module 132 and populated with the filtered and resource size appropriate metadata to generate the AI prompt.

In some embodiments, the scoring module 533 is configured to receive the AI prompt and process it to obtain current information about the repository (e.g., SCR 505) with a confidence marker in the assessment, which may be indicated by a score. Some non-limiting examples of the current information may include information pertaining to a type of application, software languages and/or frameworks used, specific types of documentation, etc. In some examples, the results determined by the scoring module 533, including the confidence indicators, may be displayed via the UI 287 of the user device 104. In this way, aspects of the present disclosure may be used to give a user information about the repository, such as SCR 505. In some instances, the scoring module 533 may also include a mechanism that allows it to easily target a number of different AI prompt analysis providers.

In some embodiments, the prioritization module 135 may be configured to use both the output of the scoring module 533 and other modules of the computing platform 502 and assign repositories a priority score/level for additional processing. For example, repositories with a high number of new commits and minimal to no activity within the computing platform 502 may be assigned a higher priority score, as a high number of new commits may indicate that these commits need to be scanned by the computing platform 502.

Figure 4A:
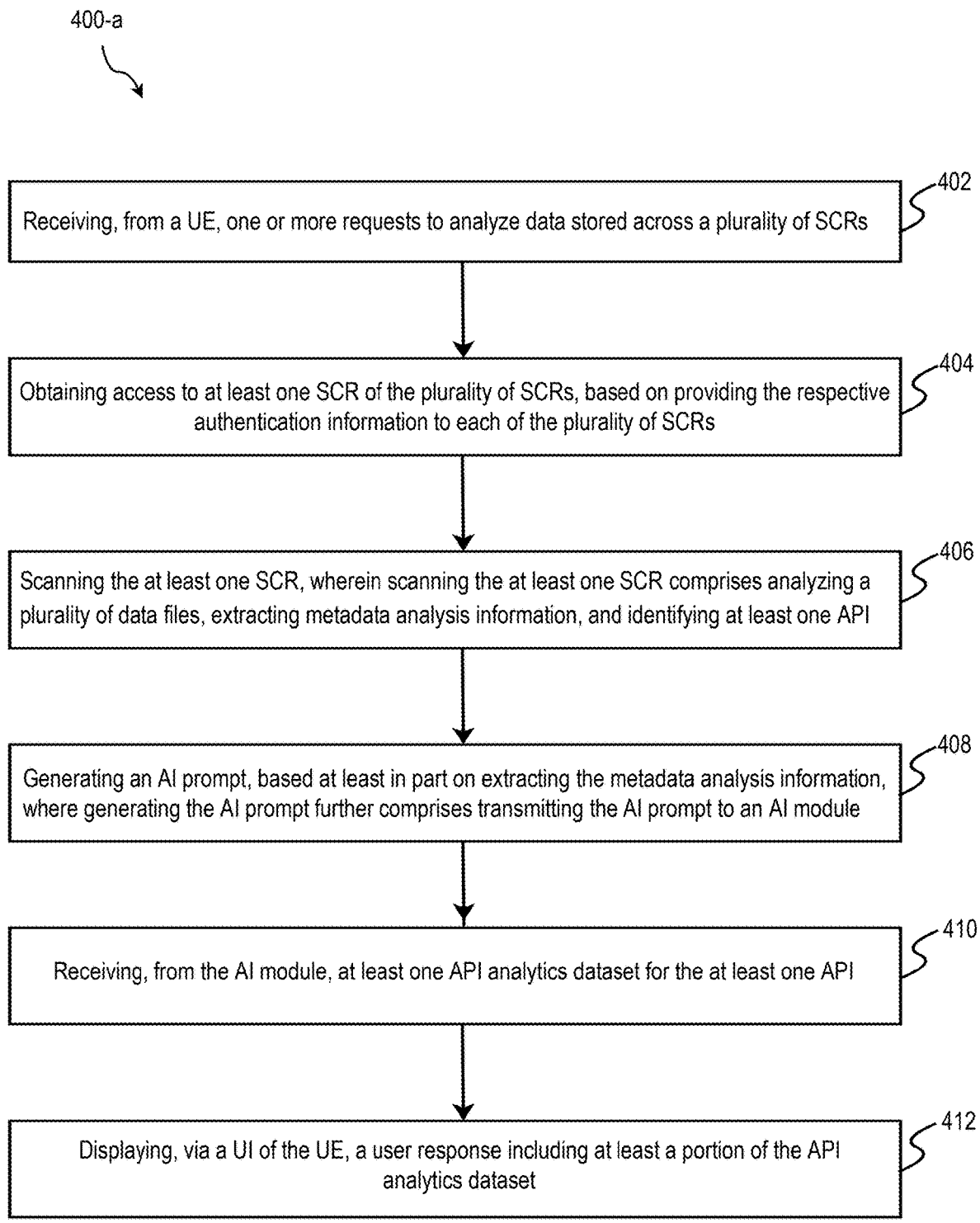
FIG. 4A illustrates an example of a method implemented using the AI-based API detection and evaluation system in FIG. 1, in accordance with various aspects of the disclosure.
Figure 4B:
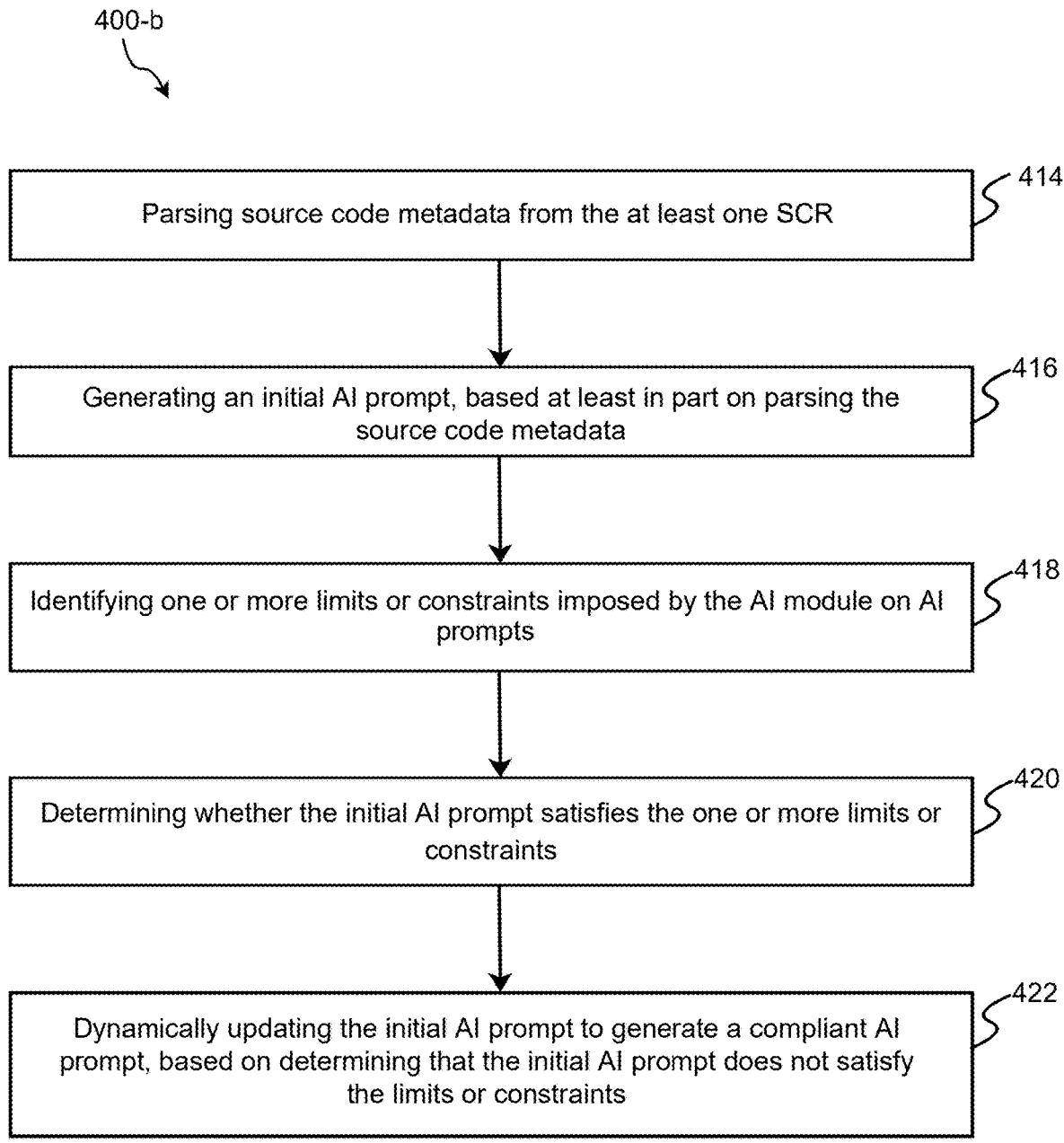
FIG. 4B illustrates another example of a method implemented using the AI-based API detection and evaluation system in FIG. 1, in accordance with various aspects of the disclosure.

FIGS. 4A-B illustrate examples of methods 400-a and 400-b, respectively, for API detection and evaluation, in accordance with various aspects of the present disclosure. The operations of method(s) 400 presented below are intended to be illustrative. In some implementations, method(s) 400 may be accomplished with one or more additional operations not described, and/or without one or more of the operations discussed. Additionally, the order in which the operations of method(s) 400 are illustrated in FIGS. 4A-B and/or described below is not intended to be limiting.

In some implementations, method(s) 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method(s) 400 in response to instructions stored electronically on an electronic storage medium. The one or more processing devices may include one or more devices configured through hardware, firmware, and/or software to be specifically designed for execution of one or more of the operations of method 700.

A first operation 402 comprises receiving, from a UE, one or more requests to analyze data stored across a plurality of SCRs, wherein the one or more requests include authentication information for accessing each of the plurality of SCRs. In some implementations, at least one of the plurality of SCRs comprises data associated with at least one API.

A second operation 404 comprises obtaining access to at least one SCR of the plurality of SCRs, based on providing the respective authentication information to each of the plurality of SCRs.

A third operation 406 comprises scanning, based on obtaining access, the at least one SCR, wherein scanning the at least one SCR comprises (1) analyzing a plurality of data files stored in the at least one SCR, (2) extracting metadata analysis information from the at least one SCR, and (3) identifying at least one API associated with the at least one SCR, based on analyzing the plurality of data files and extracting the metadata analysis information.

A fourth operation 408 comprises generating an AI prompt, based at least in part on extracting the metadata analysis information, wherein generating the AI prompt further comprises transmitting the AI prompt to an AI module.

A fifth operation 410 comprises receiving, from the AI module, at least one API analytics dataset for the at least one API.

A sixth operation 412 comprises displaying, via a UI of the UE, a user response including at least a portion of the API analytics dataset.

Turning now to FIG. 4B, which illustrates a method 400-b for API detection and evaluation, in accordance with various aspects of the present disclosure.

A first operation 414 comprises parsing source code metadata from the at least one SCR.

A second operation 416 comprises generating an initial AI prompt, based at least in part on parsing the source code metadata.

A third operation 418 comprises identifying one or more limits or constraints imposed by the AI module (or alternatively, analysis service, AI server, AI model) on AI prompts.

A fourth operation 420 comprises determining whether the initial AI prompt satisfies the one or more limits or constraints.

A fifth operation 422 comprises dynamically updating the initial AI prompt to generate a compliant AI prompt, based on determining that the initial AI prompt does not satisfy the one or more limits or constraints.

Figure 6:
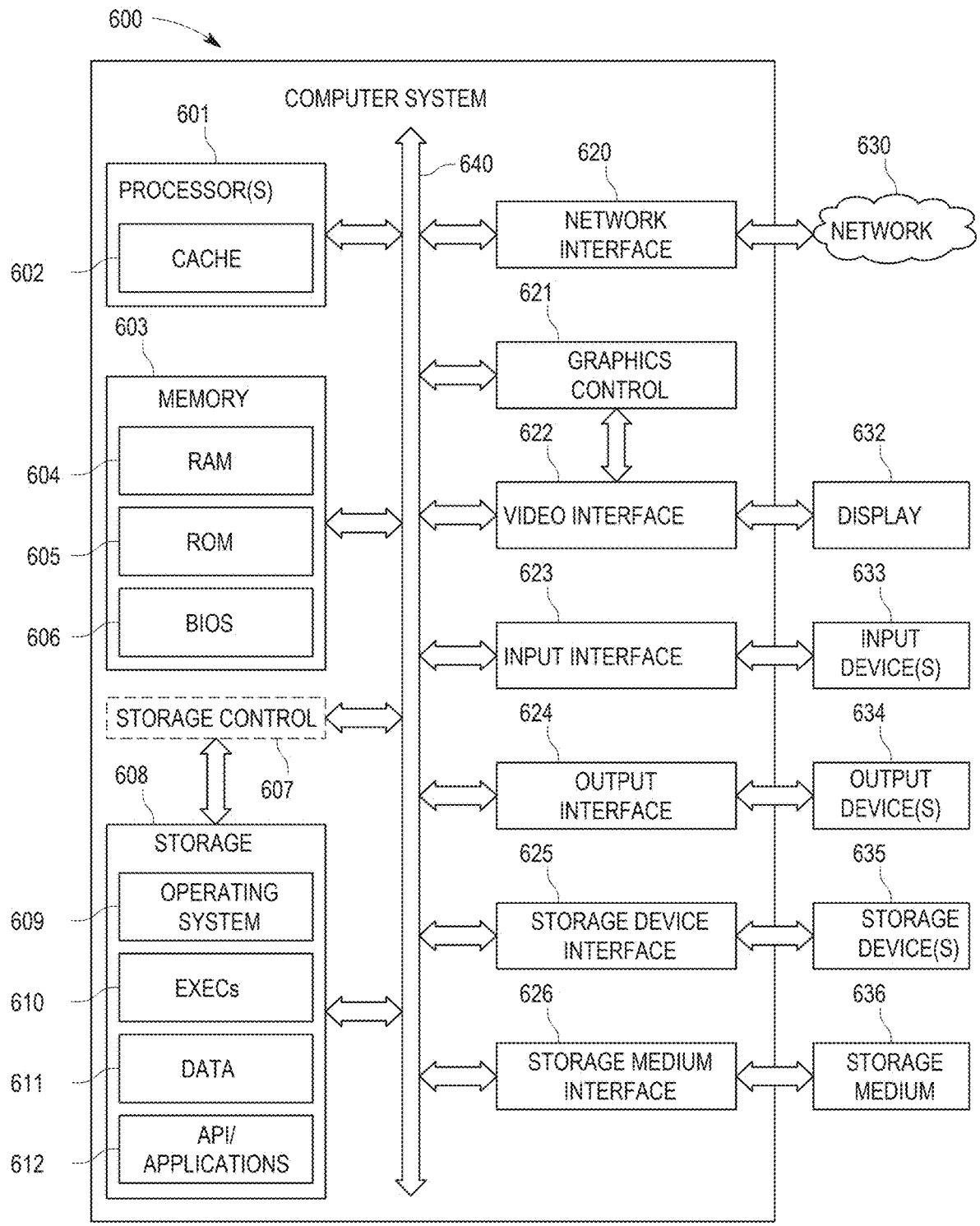
FIG. 6 illustrates a diagrammatic representation of a computer system configured for use with an AI-based API detection and evaluation system, in accordance with various aspects of the disclosure.

FIG. 6 illustrates a diagrammatic representation of one embodiment of a computer system 600, within which a set of instructions can execute for causing a device to perform or execute any one or more of the aspects and/or methodologies of the present disclosure. Specifically, but without limitation, the computer system 600 is configured for API detection and evaluation, in accordance with one or more implementations. The components in FIG. 6 are only examples and do not limit the scope of use or functionality of any hardware, software, firmware, embedded logic component, or a combination of two or more such components implementing particular embodiments of this disclosure. Some or all of the illustrated components can be part of the computer system 600. For instance, the computer system 600 can be a general-purpose computer (e.g., a laptop computer) or an embedded logic device (e.g., an FPGA), to name just two non-limiting examples.

Moreover, the components may be realized by hardware, firmware, software, or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 600 includes at least a processor 601 such as a central processing unit (CPU) or a graphics processing unit (GPU) to name two non-limiting examples. Any of the subsystems described throughout this disclosure could embody the processor 601. The computer system 600 may also comprise a memory 603 and a storage 608, both communicating with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various non-transitory, tangible computer-readable storage media 636 with each other and/or with one or more of the processor 601, the memory 603, and the storage 608. All of these elements may interface directly or via one or more interfaces or adaptors to the bus 640. For instance, the various non-transitory, tangible computer-readable storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer-readable instructions stored on at least one non-transitory, tangible computer-readable storage medium. Computer system 600 may provide functionality as a result of the processor(s) 601 executing software embodied in one or more non-transitory, tangible computer-readable storage media, such as memory 603, storage 608, storage devices 635, and/or storage medium 636 (e.g., read only memory (ROM) 605). Memory 603 may read the software from one or more other non-transitory, tangible computer-readable storage media (such as mass storage device(s) 635, 636) or from one or more other sources through a suitable interface, such as network interface 620. Any of the subsystems herein disclosed could include a network interface such as the network interface 620. The software may cause processor(s) 601 to carry out one or more processes or one or more steps of one or more processes described or illustrated herein, such as the process flows and methods described in relation to FIGS. 2, 3, and 4A-B. Carrying out such processes or steps may include defining data structures stored in memory 603 and modifying the data structures as directed by the software. In some embodiments, an FPGA can store instructions for carrying out functionality as described in this disclosure. In other embodiments, firmware includes instructions for carrying out functionality as described in this disclosure.

The memory 603 may include various components (e.g., non-transitory, tangible computer-readable storage media) including, but not limited to, a random-access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable non-transitory, tangible computer-readable storage media. In some instances, ROM 605 and RAM 604 include non-transitory, tangible computer-readable storage media for carrying out a method, such as methods and process flows described with reference to FIGS. 2, 3, and 4A-B. In one example, a basic input/output system (BIOS) 606, including basic routines that help to transfer information between elements within computer system 600, such as during start-up, may be stored in the memory 603.

Fixed storage 608 is connected bi-directionally to processor(s) 601, optionally through storage control unit 607. Fixed storage 608 provides additional data storage capacity and may also include any suitable non-transitory, tangible computer-readable media described herein. Storage 608 may be used to store operating system 609, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a touch screen, and/or a stylus in combination with a touch screen, and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network segment 630 (or simply, network 630), computer system 600 may communicate with other devices, such as mobile devices, IoT devices, servers, and/or enterprise systems, connected to network 630. Communications to and from computer system 600 may be sent through network interface 620. For example, network interface 620 may receive incoming communications (such as requests or responses from other devices, for instance, user instructions or commands, query requests, etc., from a user device) in the form of one or more packets (such as Internet Protocol (IP) packets) from network 630, and computer system 600 may store the incoming communications in memory 603 for processing. Computer system 600 may similarly store outgoing communications in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology known and/or contemplated in the art may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, etc. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition, or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an integrated circuit or IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory (e.g., RAM 604), flash memory, ROM memory (e.g., ROM 605), EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor 601 (also shown as processor 154 in FIG. 1) such that the processor 601 can read information from, and write information to, the non-transitory, tangible computer-readable storage medium. In the alternative, the non-transitory, tangible computer-readable storage medium may be integral to the processor 601. The processor 601 and the non-transitory, tangible computer-readable storage medium may reside in an ASIC. In some examples, the ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 600 shown in FIGS. 1 and/or 5A such as, but not limited to, the network 630, processor 601, memory 603, etc., may comprise a cloud computing system (e.g., cloud network 555, or simply, cloud 555 in FIG. 5A). In one such system, front-end systems such as input devices 633 may provide information to back-end platforms such as servers (e.g., computer system(s) 100 and/or 500-a, etc.) and storage (e.g., memory 603). Software (i.e., middleware) may enable interaction between the front-end and back-end systems, with the back-end system providing services and online network storage to multiple front-end clients. For example, a software-as-a-service (SAAS) model may implement such a cloud-computing system (e.g., cloud 555 in FIG. 5A). In such a system, users may operate software located on back-end servers through the use of a front-end software application such as, but not limited to, a web browser.

Processor 601, also shown as processor 154 in FIG. 1, may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 601 may be configured to operate a memory array using a memory controller. In other cases, a memory controller may be integrated into the processor. The processor 601 or processor 154 may be configured to execute computer-readable instructions stored in memory to perform various functions associated with the present disclosure. Memory 603, also shown as electronic storage 187 in FIG. 1, may include random access memory (RAM) and read only memory (ROM). The memory may store computer-readable, computer-executable software including instructions that, when executed, cause the processor 601 to perform various functions described herein. In some cases, the memory may contain, among other things, a basic input/output system (BIOS) which may control basic hardware and/or software operation such as the interaction with peripheral components or devices.

Software may include code to implement one or more aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for Application Programming Interface (API) detection and evaluation in source code repositories (SCRs), the method comprising:

receiving, from a user equipment (UE), one or more requests to analyze data stored across a plurality of SCRs, wherein,
    the one or more requests include authentication information for accessing each of the plurality of SCRs, and
    at least one of the plurality of SCRs comprises data associated with at least one Application Programming Interface (API);
obtaining access to at least one SCR of the plurality of SCRs, based on providing the respective authentication information to each of the plurality of SCRs;
scanning, based on obtaining access, the at least one SCR, wherein scanning the at least one SCR comprises:
    analyzing a plurality of data files stored in the at least one SCR,
    extracting metadata analysis information from the at least one SCR, and
    identifying at least one API associated with the at least one SCR, based on analyzing the plurality of data files and extracting the metadata analysis information;
generating an Artificial Intelligence (AI) prompt, based at least in part on extracting the metadata analysis information, wherein generating the AI prompt further comprises transmitting the AI prompt to an AI module;
receiving, from the AI module, at least one API analytics dataset for the at least one API; and
displaying, via a user interface (UI) of the UE, a user response including at least a portion of the API analytics dataset.

2. The method of claim 1 further comprising:
extracting API-specific metadata from each of the at least one API, wherein the API-specific metadata comprises one or more of API identification (ID) information, directory information, and software-framework (SW-FW) information.

3. The method of claim 1, wherein the user response for the at least one API comprises information pertaining to one or more of:
    a vulnerability level for a respective API;
    a threat score for the respective API;
    a risk assessment level for the respective API;
    a priority score for the respective API;
    one or more software (SW) languages used for the respective API;
    a deployed framework for the respective API;
    user activity history for one or more users of the respective API; and
    test history data for the respective API.

4. The method of claim 1, further comprising:
storing API-specific data associated with the at least one API to a computing platform data store, wherein the API-specific data comprises one or more of API-classification data, API-identification data, firmware (FW) data, and software (SW) data, and wherein the computing platform data store is communicatively coupled to the AI module; and
periodically updating the computing platform data store using subsequent API analytics datasets received from the AI module.

5. The method of claim 1, wherein, prior to displaying the user response, the method comprises:
    generating a static portion of the user response using a user response template;
    generating a dynamic portion of the user response using the API analytics dataset; and
    synthesizing the static and dynamic portions of the user response to generate the user response for display on the UI of the UE.

6. The method of claim 1, wherein,
the plurality of SCRs include at least a first SCR and a second SCR,
each of the first and the second SCRs comprise a plurality of repository files including one or more API-specific data files associated with one or more APIs and one or more non API files; and
wherein extracting metadata analysis information from the each of the first and the second SCRs comprises:
    identifying the one or more API-specific data files from the plurality of repository files, and
    extracting metadata associated with at least a portion of the plurality of repository files, including at least the one or more API-specific data files.

7. The method of claim 6, wherein the first and the second SCRs comprise one or more differences related to one or more of:
    file directory organization;
    depth and breadth of file directories;
    available support for one or more of version control, intra-organization collaboration, inter-organization collaboration, access control, and authorization control;
    file naming conventions;
    file path conventions; and
    metadata information.

8. The method of claim 1, wherein,
the at least one API analytics dataset for the at least one API comprises a plurality of API analytics datasets, including at least a first API analytics dataset for a first SCR and a second API analytics dataset for a second SCR,
the first API analytics dataset is generated by selecting a first AI model and applying the first AI model to a first AI prompt,
the second API analytics dataset is generated by selecting a second AI model and applying the second AI model to a second AI prompt,
the first AI model is different from the second AI model, and
the first AI prompt is different from the second AI prompt.

9. The method of claim 8, wherein selection of the first and second AI models is based at least in part on the generated AI prompt and metadata analysis information for a respective one of the first and the second SCRs, and wherein the respective metadata analysis information for the first and the second SCRs comprises one or more of:
    file-type ID information for a plurality of repository files stored in the respective SCR, and
    API classification information for each API stored in the respective SCR.

10. The method of claim 1, wherein generating the AI prompt comprises:
    parsing source code metadata from the at least one SCR;
    generating an initial AI prompt, based at least in part on parsing the source code metadata;
    identifying one or more limits or constraints imposed by the AI module on AI prompts;
    determining whether the initial AI prompt satisfies the one or more limits or constraints; and
    dynamically updating the initial AI prompt to generate a compliant AI prompt, based on determining that the initial AI prompt does not satisfy the one or more limits or constraints.

11. The method of claim 10, wherein the generated AI prompt comprises one of the initial AI prompt or the compliant AI prompt.

12. The method of claim 1, wherein, prior to receiving the at least one API analytics dataset, the method comprises:
- selecting, by the AI module, an AI model from a plurality of AI models; and
- applying, by the AI module, the selected AI model to the AI prompt to generate the API analytics dataset; and
- wherein the AI model is selected from a group consisting of a text-based model, a large language model (LLM), a machine-learning (ML) model, an artificial neural network (ANN) model, a decision tree model, a reinforcement learning model, and a transformer model.

13. The method of claim 1, wherein displaying the user response comprises displaying the API analytics dataset using one or more of: a graph, a summary report, a table, a risk assessment matrix, a risk assessment chart, a risk heat map, a vulnerability chart, a pie chart, and a bar graph.

14. A system configured for Application Programming Interface (API) detection and evaluation using a computing platform, the system comprising:
- one or more hardware processors configured by machine-readable instructions to:
  - receive, from a user equipment (UE), one or more requests to analyze data stored across a plurality of source code repositories (SCRs), wherein,
    - the one or more requests include authentication information for accessing each of the plurality of SCRs, and
    - at least one of the plurality of SCRs comprises data associated with at least one API;
  - obtain access to at least one SCR of the plurality of SCRs, based on providing the respective authentication information to each of the plurality of SCRs;
  - scan, based on obtaining access, the at least one SCR, wherein scanning the at least one SCR comprises:
  - analyzing a plurality of data files stored in the at least one SCR,
  - extracting metadata analysis information from the at least one SCR, and
  - identifying at least one API associated with the at least one SCR, based on analyzing the plurality of data files and extracting the metadata analysis information;
  - generate an Artificial Intelligence (AI) prompt, based at least in part on extracting the metadata analysis information, wherein generating the AI prompt further comprises transmitting the AI prompt to an AI module;
  - receive, from the AI module, at least one API analytics dataset for the at least one API; and
  - display, via a user interface (UI) of the UE, a user response including at least a portion of the API analytics dataset.

15. The system of claim 14, wherein the one or more hardware processors are further configured by machine-readable instructions to:
- extract API-specific metadata from each of the at least one API, wherein the API-specific metadata comprises one or more of API identification (ID) information, directory information, and software-framework (SW-FW) information.

16. The system of claim 14, wherein, prior to displaying the user response, the one or more hardware processors are configured by machine-readable instructions to:
- generate a static portion of the user response using a user response template;
- generate a dynamic portion of the user response using the API analytics dataset; and
- synthesize the static and dynamic portions of the user response to generate the user response for display on the UI of the UE.

17. The system of claim 14, wherein,
- the plurality of SCRs include at least a first SCR and a second SCR,
- each of the first and the second SCRs comprise a plurality of repository files including one or more API-specific data files associated with one or more APIs and one or more non API files; and
- wherein extracting metadata analysis information from the each of the first and the second SCRs comprises:
  - identifying the one or more API-specific data files from the plurality of repository files, and
  - extracting metadata associated with at least a portion of the plurality of repository files, including at least the one or more API-specific data files.

18. The system of claim 14, wherein generating the AI prompt comprises:
- parsing source code metadata from the at least one SCR;
- generating an initial AI prompt, based at least in part on parsing the source code metadata;
- identifying one or more limits or constraints imposed by the AI module on AI prompts;
- determining whether the initial AI prompt satisfies the one or more limits or constraints; and
- dynamically updating the initial AI prompt to generate a compliant AI prompt, based on determining that the initial AI prompt does not satisfy the one or more limits or constraints.

19. The system of claim 14, wherein prior to receiving the at least one API analytics dataset, the one or more hardware processors are configured by machine-readable instructions to:
- select an AI model from a plurality of AI models; and
- apply the selected AI model to the AI prompt to generate the API analytics dataset; and
- wherein the AI model is selected from a group consisting of a text-based model, a large language model (LLM), a machine-learning (ML) model, an artificial neural network (ANN) model, a decision tree model, a reinforcement learning model, and a transformer model.

20. A non-transient computer-readable storage medium having instructions embodied thereon, the instructions being executable by one or more processors to perform a method for Application Programming Interface (API) detection and evaluation using a computing platform, the method comprising:
- receiving, from a user equipment (UE), one or more requests to analyze data stored across a plurality of source code repositories (SCRs), wherein,
  - the one or more requests include authentication information for accessing each of the plurality of SCRs, and
  - at least one of the plurality of SCRs comprises data associated with at least one API;
- obtaining access to at least one SCR of the plurality of SCRs, based on providing the respective authentication information to each of the plurality of SCRs;
- scanning, based on obtaining access, the at least one SCR, wherein scanning the at least one SCR comprises:
- analyzing a plurality of data files stored in the at least one SCR,
- extracting metadata analysis information from the at least one SCR, and
- identifying at least one API associated with the at least one SCR, based on analyzing the plurality of data files and extracting the metadata analysis information;

generating an Artificial Intelligence (AI) prompt, based at least in part on extracting the metadata analysis information, wherein generating the AI prompt further comprises transmitting the AI prompt to an AI module;

receiving, from the AI module, at least one API analytics dataset for the at least one API; and displaying, via a user interface (UI) of the UE, a user response including at least a portion of the API analytics dataset.

\* \* \* \* \*